United States Patent
Sosa

(10) Patent No.: US 10,538,186 B2
(45) Date of Patent: Jan. 21, 2020

(54) REDUCED-IMPACT-AND-RECOIL HEADREST

(71) Applicant: Michael P. Sosa, Tampa, FL (US)

(72) Inventor: Michael P. Sosa, Tampa, FL (US)

(*) Notice: Subject to any disclaimer, the term of this patent is extended or adjusted under 35 U.S.C. 154(b) by 0 days.

(21) Appl. No.: 16/418,673

(22) Filed: May 21, 2019

(65) Prior Publication Data
US 2019/0291620 A1  Sep. 26, 2019

Related U.S. Application Data

(63) Continuation-in-part of application No. 16/238,867, filed on Jan. 3, 2019, which is a continuation of
(Continued)

(51) Int. Cl.
*B60N 2/42* (2006.01)
*B60N 2/888* (2018.01)
(Continued)

(52) U.S. Cl.
CPC ............ *B60N 2/888* (2018.02); *B60N 2/865* (2018.02); *B60N 2002/899* (2018.02); *B60N 2205/20* (2013.01)

(58) Field of Classification Search
CPC ...... B60N 2/42; B60N 2/4221; B60N 2/4228; B60N 2/427; B60N 2/865; B60N 2/888; B60N 2002/899; B60N 2205/20
(Continued)

(56) References Cited

U.S. PATENT DOCUMENTS 4,674,792 A * 6/1987 Tamura ................. B60N 2/847
                                                   297/408
4,674,797 A * 6/1987 Tateyama ............. B60N 2/847
                                                   297/408
(Continued)

FOREIGN PATENT DOCUMENTS

DE   102004059237 B3 *  2/2006 ............. B60N 2/888
DE   102008012217 A1 *  5/2009 ............. B60N 2/888
(Continued)

*Primary Examiner* — Ryan D Kwiecinski
(74) *Attorney, Agent, or Firm* — Smith & Hopen, P.A.; Paul Murty

(57) ABSTRACT

A reduced-impact-and-recoil headrest that includes a ratchet mechanism, allowing components to incrementally translate with respect to each other. The reduced-impact-and-recoil headrest includes an exterior housing surface that is deformable, providing cushioning for a vehicle occupant's head. The headrest also includes an interior compartment within the housing, with the ratchet mechanism disposed within the interior compartment. The headrest is configured to decrease the force of a collision experienced by the occupant, thereby decreasing the likelihood and severity of traumatic brain injuries resulting from the occupant's head striking a stationary headrest. Instead, the reduced-impact-and-recoil headrest is configured to incrementally move with the occupant's head, providing an incremental cushion for the occupant's head. The ratchet mechanism also prevents the reduced-impact-and-recoil headrest from automatically translating back to its pre-impact position, thereby decreasing the occupant's risk of ligament tear and whiplash.

14 Claims, 16 Drawing Sheets

Related U.S. Application Data application No. 15/934,424, filed on Mar. 23, 2018, now Pat. No. 10,207,617.

(51) Int. Cl.
  *B60N 2/865* (2018.01)
  *B60N 2/80* (2018.01)

(58) Field of Classification Search
  USPC .................................................. 297/216.12
  See application file for complete search history.

(56) References Cited

U.S. PATENT DOCUMENTS

| | | | | |
|---|---|---|---|---|
| 5,054,856 | A * | 10/1991 | Wang | B60N 2/865 |
| | | | | 297/408 |
| 6,045,181 | A * | 4/2000 | Ikeda | B60N 2/847 |
| | | | | 297/216.12 |
| 2013/0249268 | A1* | 9/2013 | Hemmelrath | B60N 2/888 |
| | | | | 297/391 |
| 2014/0145489 | A1* | 5/2014 | Wang | B60N 2/809 |
| | | | | 297/410 |
| 2017/0120786 | A1* | 5/2017 | Cao | B60N 2/80 |
| 2018/0001803 | A1* | 1/2018 | Ishihara | B60N 2/862 |

FOREIGN PATENT DOCUMENTS

| | | | | |
|---|---|---|---|---|
| DE | 102009038631 A1 * | 5/2010 | | B60N 2/818 |
| FR | 2979867 A1 * | 3/2013 | | B60N 2/888 |
| JP | 2004306781 A * | 11/2004 | | B60N 2/4279 |
| WO | WO-2012118341 A2 * | 9/2012 | | A47C 7/38 |
| WO | WO-2014103047 A1 * | 7/2014 | | B60N 2/818 |
| WO | WO-2015093529 A1 * | 6/2015 | | |

* cited by examiner

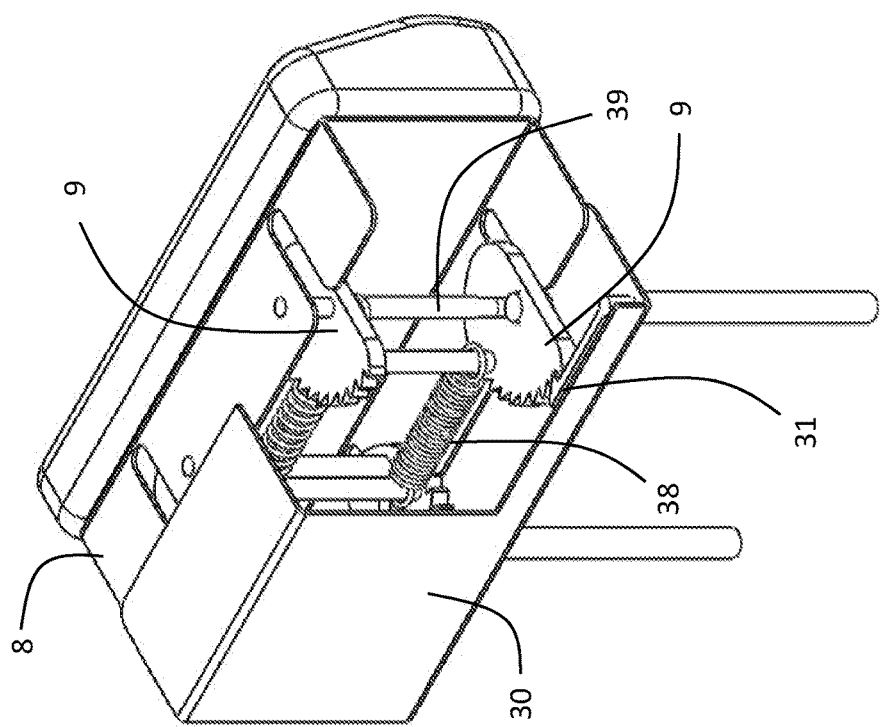
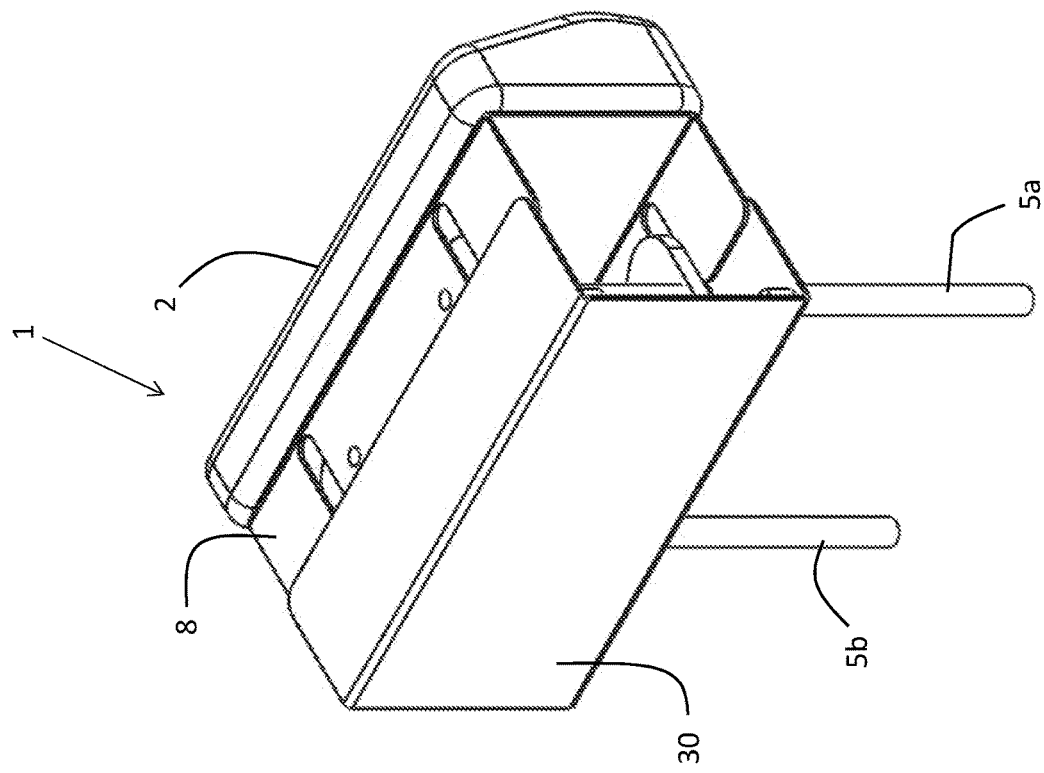

REDUCED-IMPACT-AND-RECOIL HEADREST

CROSS-REFERENCE TO RELATED APPLICATIONS

This nonprovisional application is a continuation-in-part of and claims priority to nonprovisional application Ser. No. 16/238,867, entitled "Reduced-Impact-And-Recoil Headrest," filed on Jan. 3, 2019, which is a continuation of and claims priority to U.S. Pat. No. 10,207,617, entitled "Reduced-Impact-And-Recoil Headrest," issued on Feb. 19, 2019, each by the same inventor.

BACKGROUND OF THE INVENTION

1. Field of the Invention

This invention relates, generally, to a reduced-impact-and-recoil headrest. More specifically, it relates to a headrest that includes a ratchet mechanism, whereby the ratchet mechanism allows the headrest to cushion an occupant's head and prevents the occupant's head from springing toward a front end of a vehicle during a collision.

2. Brief Description of the Prior Art

Automotive accidents represent a leading cause of death and injury, both worldwide and in the United States. Safety measures exist to prevent injuries in the event of a collision, such as the use of seatbelts, airbags, and headrests. Despite these safety measures, thousands of people die in automotive accidents each year, with millions more obtaining injuries as a result of collisions. The frequency and severity of automotive accidents results in billions of dollars spent each year on insurance, treatments, and repair. [1].

Some of the most severe injuries sustained during an automotive accident are traumatic brain injuries (TBIs), such as a concussion, hematoma, contusion, whiplash, and skull fracture. TBIs are some of the most dangerous injuries that can occur, often leading to death or long-term injury. TBIs occur due to an occupants' brain contacting the skull in the event of an extreme force, which can cause bruising or bleeding of the brain. For example, during an automotive accident, the occupant's head could forcefully collide with the steering wheel of the automobile. Alternatively, the occupant's head could be forced backward, colliding with a headrest on a seat. While the headrest is often cushioned to some degree, the force of the collision and the stationary nature of the headrest can lead to a severe TBI.

Attempts have been made to introduce headrests that can detect and respond to a collision, decreasing the occupant's risk of TBI. U.S. Pat. No. 8,052,211 discloses an active headrest that is actuated to translate toward an occupant in the event of a collision. Similarly, U.S. Pat. No. 7,926,871 discloses a moveable headrest that that adjusts a two-point support system in the event of a collision. Support is shifted between two areas, depending on the impact of the collision and the location of the occupant's head. While both the '211 patent and the '871 patent disclose improvements on traditional headrests, the references rely on the movement of the headrest in relation to the occupant's head. As a result, the references inherently rely on sensors and other electronic components to control the headrest's movement. In the event of a sensor failure, the headrests would function similar to traditional headrests, losing the disclosed improvements. Moreover, the headrests do not cushion the occupant's head in the event of a collision; instead, the headrests remain stationary when receiving the occupant's head, thereby failing to gently, cushion the head during the collision. Finally, the headrests do not reduce the recoil of the occupant's head toward the front end of the vehicle; instead, the occupant's head typically springs forward, which can lead to ligament tears and whiplash.

Accordingly, what is needed is a reduced-impact-and-recoil headrest that relies on a mechanical interaction between component parts to cushion an occupant's head and prevent whiplash in the event of an automobile collision. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a mechanical reduced-impact-and-recoil headrest that cushions a vehicle occupant's head and neck and minimizes recoil via a ratchet mechanism, thereby decreasing the impact felt by the occupant, is now met by a new, useful, and nonobvious invention.

The novel structure includes a housing having one or more exterior walls and adapted to be installed within a vehicle having a longitudinal axis from a front bumper to a rear bumper, and a lateral axis from a driver side to a passenger side. The housing includes an interior compartment disposed therein, with a first and second lateral interior surface disposed within the interior compartment. Each lateral interior surface is disposed adjacent to one of the side walls. The interior compartment also includes a bracket having a pair of opposing lateral contacting surfaces that are in mechanical communication with the first and second lateral interior surfaces. The lateral contacting surfaces, which may be ratcheting surfaces, are tapered extensions on the bracket; similarly, the lateral interior surfaces, which may be ratchet walls, include tapered cutouts to receive the tapered extensions, such that the lateral contacting surfaces are complementary and achiral to the lateral interior surfaces. In addition, a biasing member forces at least one of the lateral contacting surfaces and at least one of the lateral interior surfaces into contact with each other. As such, the ratchet mechanism formed by the lateral interior surfaces and the lateral contacting surfaces prevents the reduced-impact-and-recoil headrest from automatically returning to its pre-impact position, which reduces the occupant's risk of TBIs, such as whiplash.

In an embodiment, an interior proximal wall is disposed within the interior compartment and adjacent to an exterior proximal wall of the housing. The exterior proximal wall and the interior proximal wall may be made of deformable materials, allowing the walls to deform toward a distal wall during an impact. During the impact, the interior proximal wall is configured to receive the partially deformed exterior wall, and to translate along the longitudinal axis of the vehicle toward the distal wall. The exterior proximal wall and the interior proximal wall are thereby adapted to cushion a vehicle occupant's head and neck during a collision as the reduced-impact-and-recoil headrest absorbs a portion of the kinetic energy of the impact, helping to reduce the risk and severity TBIs.

In an embodiment, the bracket is stationary with respect to the housing, with the housing being capable of translating toward and away from the bracket along the longitudinal axis of the vehicle. The bracket includes a pair of stalks that extend in a direction away from the housing. The stalks are adapted to be received by a pair of complementary apertures disposed in an upper surface of a vehicle seat, allowing the bracket to be secured against the vehicle seat.

The biasing member may be one or more springs that mechanically couple at least one of the lateral interior surfaces with a side wall of the housing, such as a driver-side-facing wall or a passenger-side-facing-wall. During transition between a pre-impact configuration and a post-impact configuration, the lateral interior walls are adapted to translate along the lateral axis of the vehicle toward respective side walls by compressing the one or more springs. The compression of the one or more springs allows the lateral interior walls to traverse between engagement surfaces on the lateral contacting surfaces, thereby incrementally translating the reduced-impact-and-recoil headrest toward the bracket. One or more reset tabs may be disposed on the housing and mechanically coupled to the lateral interior walls. The reset tabs are adapted to at least partially compress the one or more springs, thereby retracting one or more of the lateral interior walls toward the side walls, allowing the housing to be translated with respect to the bracket along the longitudinal axis of the vehicle.

An object of the invention is to provide a ratchet mechanism that decreases the risk and impact of a traumatic brain injury and minimizes the recoil of an occupant's head, thereby preventing whiplash in the event of a vehicle collision, without relying on sensors or other electrical components.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 6A is a perspective view of an embodiment of a reduced-impact-and-recoil headrest in a pre-impact configuration.

FIG. 6B is a perspective view of the headrest of FIG. 6A with an outer wall removed to show the internal components of the headrest

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In a two-car collision, one car transfers kinetic energy to the other car, thereby exerting a force on the occupants of each car. For example, if a moving vehicle strikes a stationary vehicle from behind, the moving vehicle transfers kinetic energy to the stationary vehicle. As the stationary vehicle gains the kinetic energy transferred by the moving vehicle, the stationary vehicle translates away from the point of impact. While this happens, an occupant within the stationary vehicle translates toward the point of impact as a result of the impact's force. After the previously-stationary vehicle comes to rest, the occupant typically translates away from the point of impact, toward his or her initial position. As a result, a rear-end collision typically results in the occupant's head impacting a headrest before returning to an initial position. Similarly, a front-end collision results in the occupant's head translating toward a windshield before translating back toward the headrest. In either collision, there is a risk that the occupant's head contacts the headrest at some point during the collision. If the headrest is unmovable, the occupant can experience a traumatic brain injury from striking the headrest with a force.

Example 1

The present invention includes a reduced-impact-and-recoil headrest including complementary components adapted to translate upon impact via a ratchet mechanism. The ratchet mechanism is adapted to cushion a vehicle occupant's head during a collision, as well as minimize recoil to prevent whiplash. The reduced-impact-and-recoil headrest includes a housing and a bracket disposed within the housing. The bracket and the housing each include complementary surfaces configured to form a part of the ratchet mechanism. During an impact, either the housing or the bracket translates with respect to the other component, allowing the occupant's head and neck to be cushioned from the full force of the impact. In addition, the opposing surfaces of the ratchet mechanism prevent the translatable component from recoiling toward an initial position, thereby minimizing the risk of the occupant experiencing whiplash.

Figure 1:
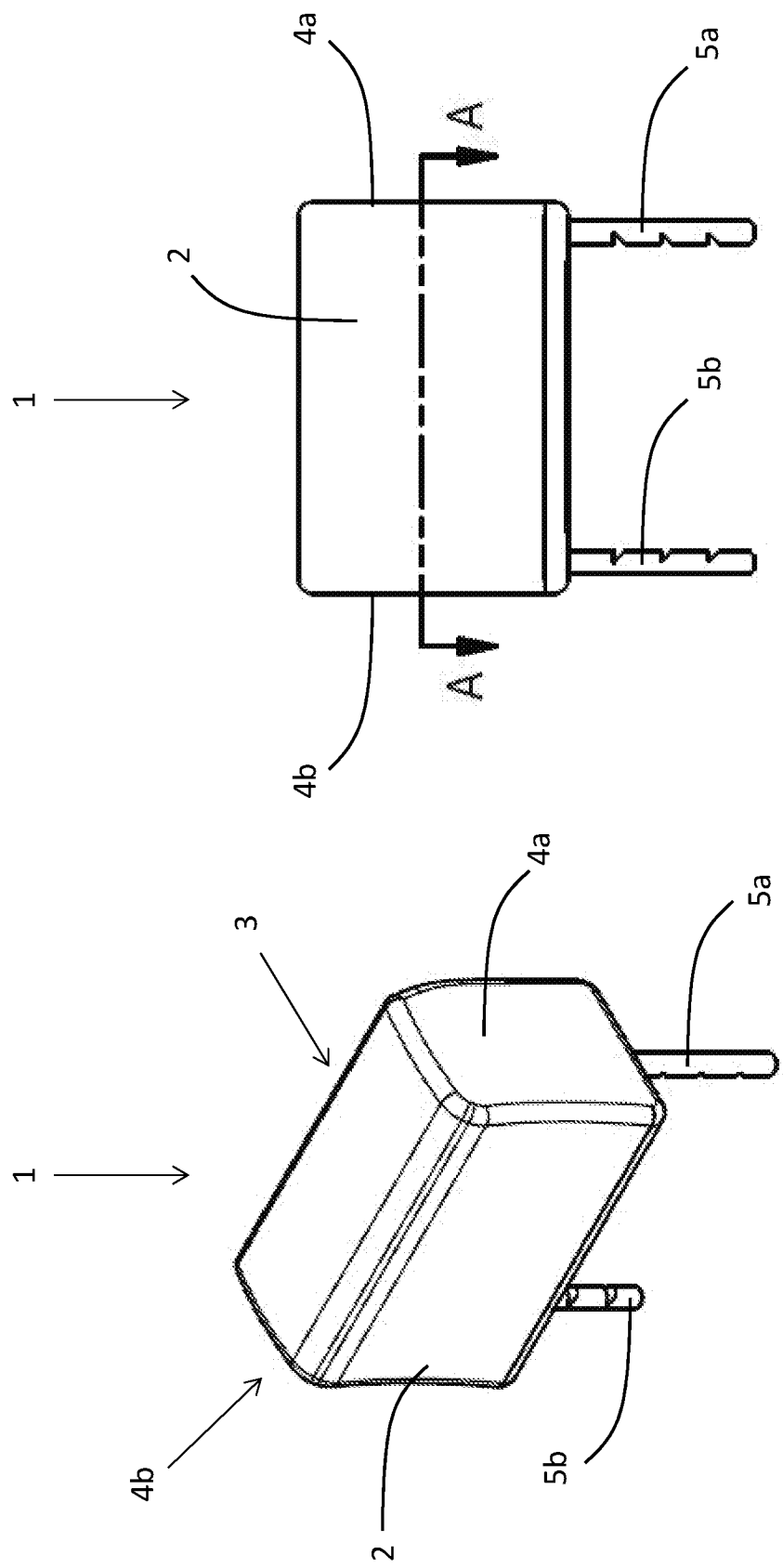
FIG. 1A is a perspective view of a reduced-impact-and-recoil headrest.
FIG. 1B is a proximal side view of a reduced-impact-and-recoil headrest.

As shown in FIGS. 1A and 1B, reduced-impact-and-recoil headrest 1 includes one or more exterior walls, such as proximal wall 2 opposite distal wall 3. Side walls 4a, 4b mechanically couple to proximal wall 2 and distal wall 3. Side walls 4a, 4b may be referred to as a driver-side-facing wall and a passenger-side-facing wall, depending on the orientation of reduced-impact-and-recoil headrest 1 within a vehicle Reduced-impact-and-recoil headrest 1 includes stalks 5a, 5b, which extend downward and away from headrest 1. Stalks 5a, 5b are adapted to be received by a pair of complementary apertures disposed on the upper surface of a seat within a vehicle, similar to prior art headrests. When reduced-impact-and-recoil headrest 1 is installed in the vehicle via stalks 5a, 5b, proximal wall 2 is adapted to face a front windshield of the vehicle, thereby being disposed to receive an occupant's head.

Figure 2:
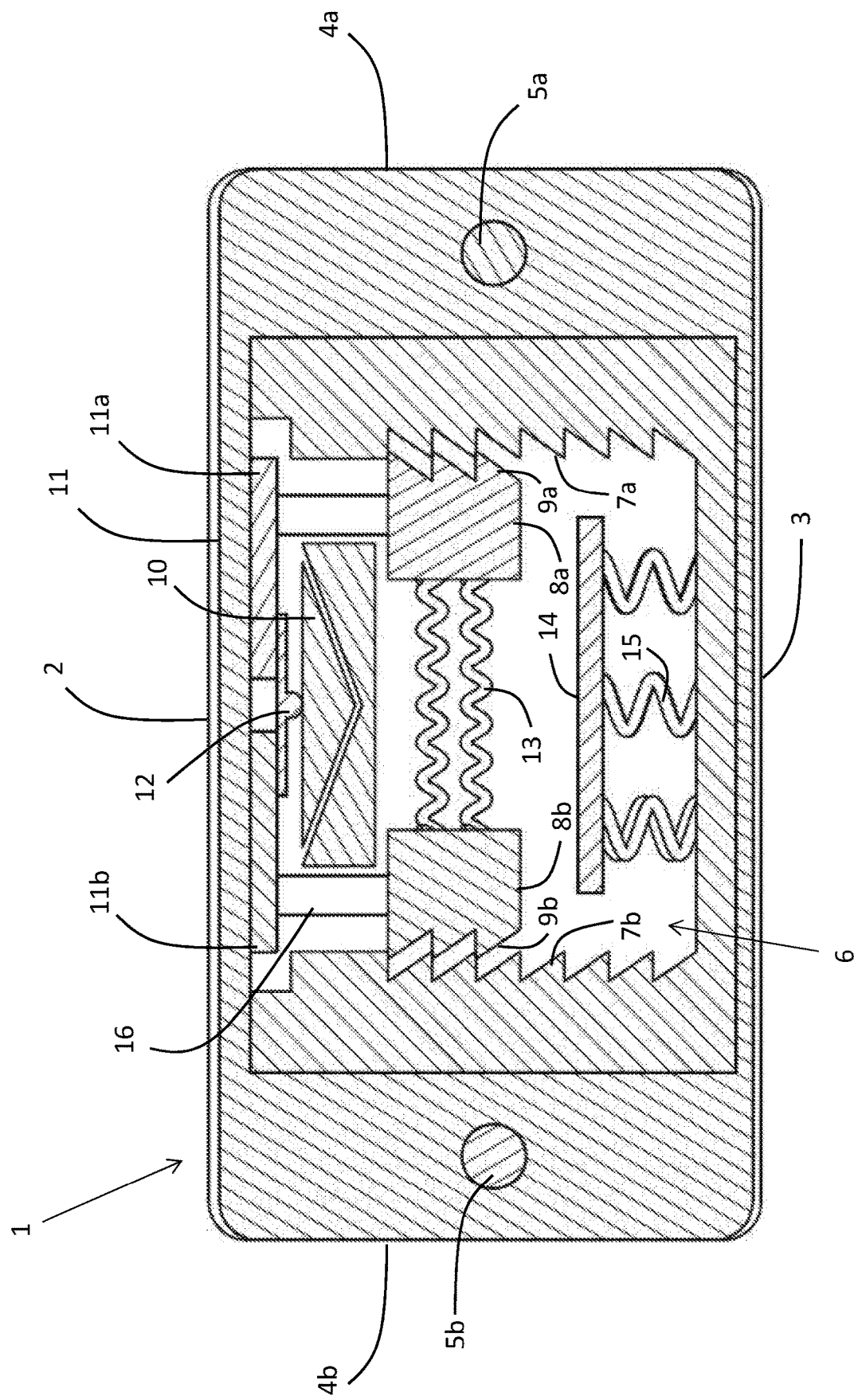
FIG. 2 is a cross-sectional view of a reduced-impact-and-recoil headrest with a stationary housing along section line A-A of 1B.

As shown in FIG. 2, the one or more exterior walls of reduced-impact-and-recoil headrest 1 forms a housing. During a collision or other impact, when kinetic energy is transferred between vehicles involved in the collision, the occupants of the vehicles often contact headrests with a force determined by the transferred energy. As such, proximal wall 2 is adapted to translate toward distal wall 3 when proximal wall 2 receives a vehicle occupant's head, due to the force exerted on proximal wall 2 by the occupant. The housing is adapted to be installed within a vehicle via stalks 5a, 5b, as described above. Alternatively, the housing could include apertures in place of stalks 5a, 5b, to retrofit the housing onto pre-existing stalks on a vehicle seat.

Figure 3A:
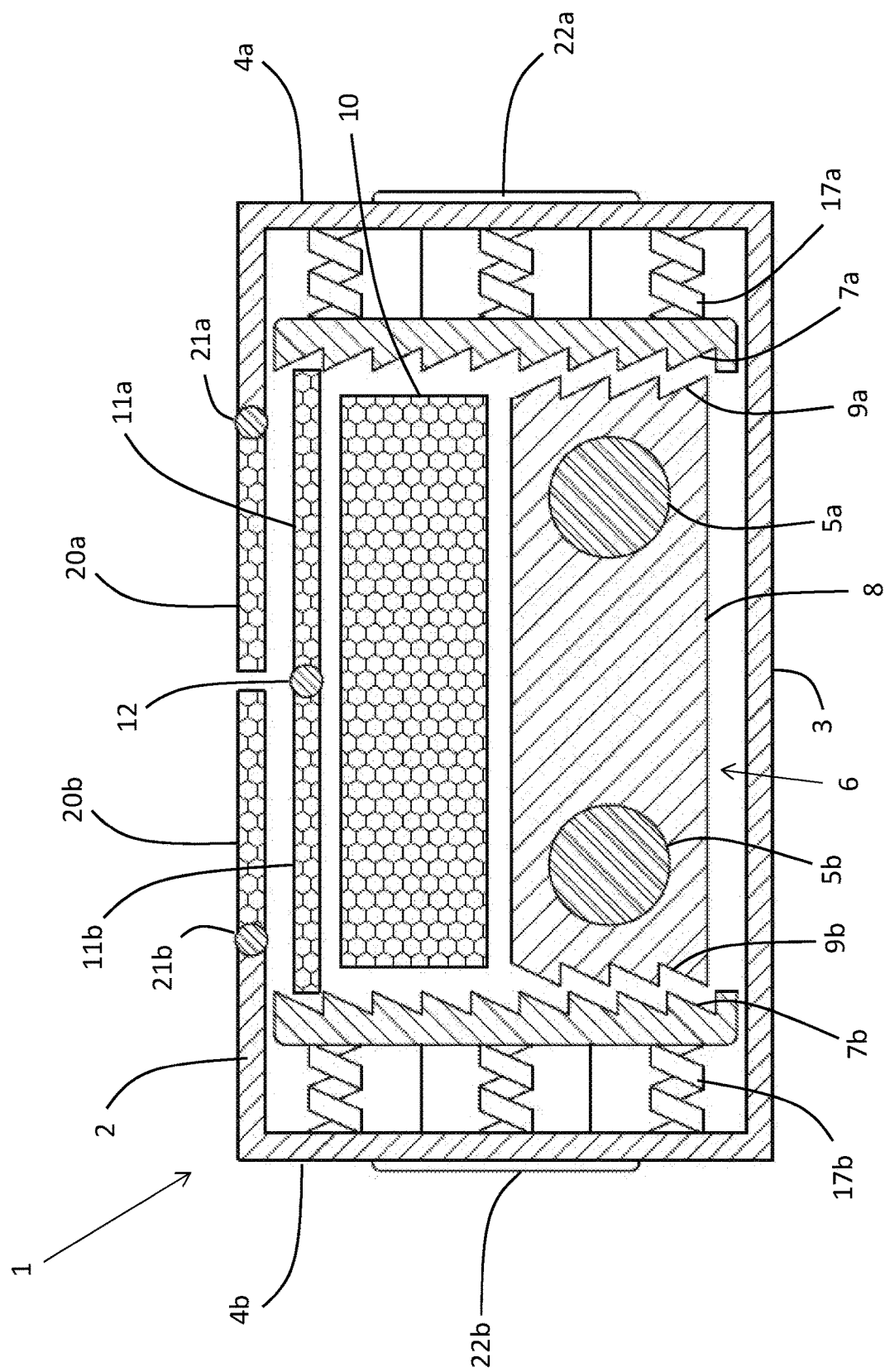
FIG. 3A is a cross-sectional view of a reduced-impact-and-recoil headrest with a nonstationary housing in a pre-impact configuration.
Figure 3B:
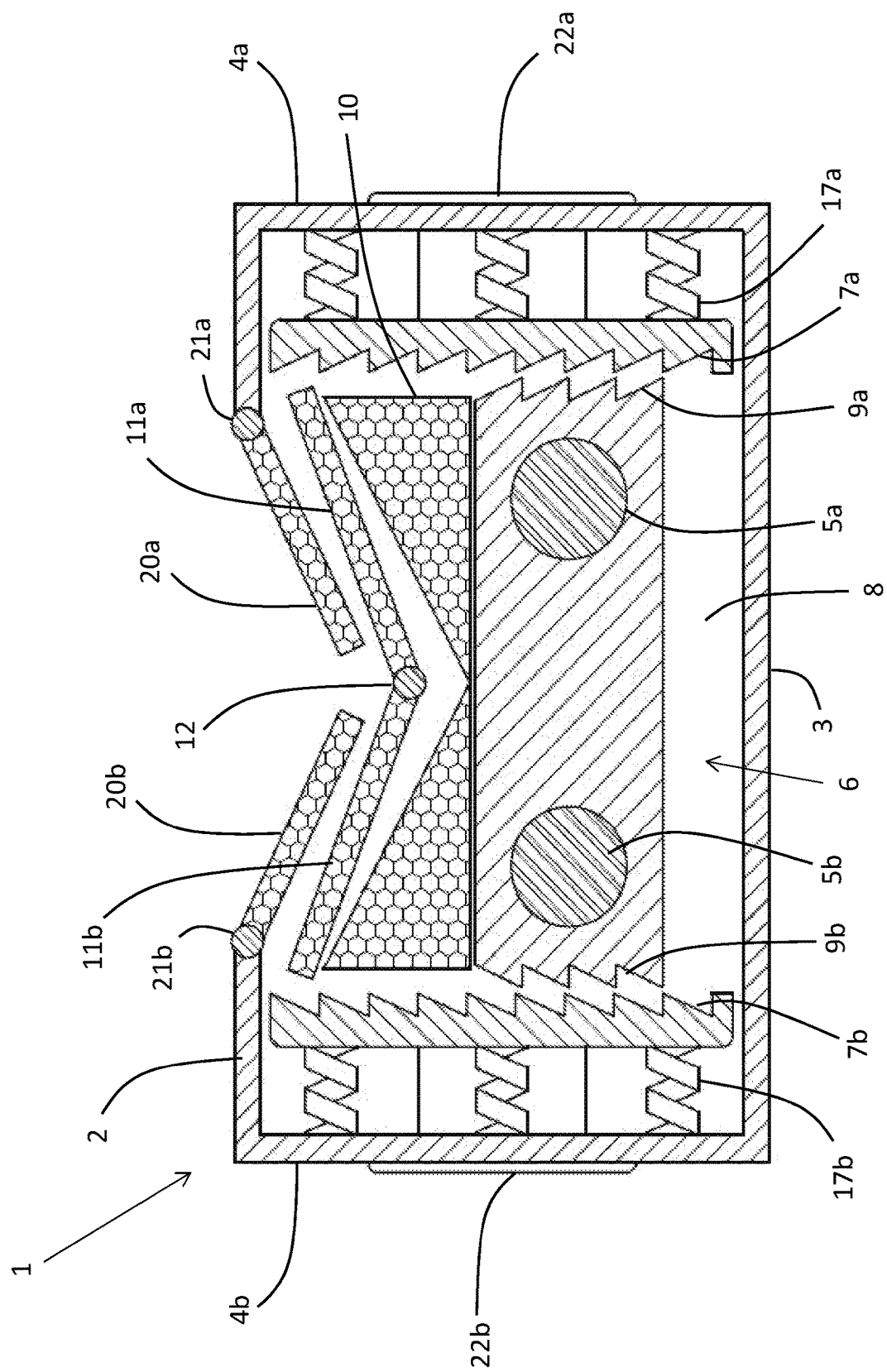
FIG. 3B is a cross-sectional view of a reduced-impact-and-recoil headrest with a nonstationary housing in a post-impact configuration.

Referring now to FIGS. 2-3B, the housing includes interior compartment 6 disposed therein. Interior compartment 6 is partially defined by first lateral interior wall 7a, which may be referred to as ratchet wall 7a, and second lateral interior wall 7b, which may be referred to as ratchet wall 7b (first and second ratchet walls 7a, 7b may be referred to collectively as ratchet walls 7). Ratchet walls 7 are defined by a plurality of tapered cutouts that are acute with respect to a lateral axis of reduced-impact-and-recoil headrest 1. The lateral axis spans from proximal wall 2 to distal wall 3. Each tapered cutout provides a downward slope from proximal wall 2 to distal wall 3, the slopes extending away from side walls 4a, 4b.

Bracket 8 is disposed within interior compartment 6, and includes first and second lateral contacting surfaces 9a, 9b, which may be referred to as ratcheting surfaces 9a, 9b (collectively referred to as ratcheting surfaces 9). Each of ratcheting surfaces 9a, 9b are defined by a plurality of tapered extensions from opposing sides of bracket 8. The tapered extensions thereby extend toward side walls 4a, 4h, and are achiral with respect to ratchet walls 7. Because ratcheting surfaces 9 and ratchet walls 7 are achiral with respect to each other, the tapered extensions of ratcheting surfaces 9 can be received by the tapered cutouts of ratchet walls 7, forming a rectangular shape. Accordingly, ratcheting surfaces 9 can be described as being complementary to ratchet walls 7. While the cutouts and extensions are described as being tapered, it is contemplated that a similar ratchet mechanism can be accomplish through polygonal cutouts and extensions, so long as the extensions require a force to translate to different cutouts, and vice versa.

Moreover, the achiral relationship between ratcheting surfaces 9 and ratchet walls 7 allows bracket 8 to translate toward distal wall 3 along the individual tapered cutouts of ratchet walls 7. The ratchet mechanism, which includes ratcheting surfaces 9 and ratchet walls 7, thereby allows ratcheting surfaces 9 to rest on ratchet walls 7 in a pre-impact configuration, and slide down the tapered cutouts after a force is exerted against proximal wall 2. As such, the ratchet mechanism allows proximal wall 2 to translate toward distal wall 3. Since ratcheting surfaces 9 travel down the slopes created by the tapered cutouts of ratchet walls 7, the friction between ratcheting surfaces 9 and ratchet walls 7 slow the translation of bracket 8 toward distal wall 3. As a result of the interaction between bracket 8 and ratchet walls 7, and the friction between the surfaces during translation, reduced-impact-and-recoil headrest is adapted to dampen the force of the impact on the occupant's head and neck. In addition, ratcheting surfaces 9 cannot travel back toward the front end of the vehicle due to the slopes of ratchet walls 7, which thereby minimizes the occupant's risk of whiplash caused by the occupant's head and neck recoiling back toward the front of the vehicle post-collision.

As seen in FIG. 2, bracket 8 includes two halves, 8a and 8b, that are joined together via spring 13, which is a biasing member. Half 8a includes ratcheting surface 9a, and half 8b includes ratcheting surface 9b, with ratcheting surfaces 9a, 9b adapted to incrementally translate along first and second ratchet walls 7a, 7b. Spring 13 allows halves 8a, 8b to translate toward and away from each other along the lateral axis of a vehicle from driver side to passenger side. In addition, spring 13, as a biasing member, forces at least one of ratcheting surfaces 9a, 9b and at least one of ratchet walls 7a, 7b into contact with each other.

During an impact, a portion of the kinetic energy of the impact is transferred to bracket 8, which causes bracket 8 to translate toward distal wall 3. Because ratcheting surfaces 9a, 9b are mechanically coupled to first and second ratchet walls 7a, 7h, some of the kinetic energy is lost due to the friction between surfaces 9a, 9b and walls 7a, 7b, as discussed above. As bracket 8 translates along ratchet walls 7, the tapered extensions of ratcheting surfaces 9a, 9b must translate to a different tapered cutout on first and second ratchet walls 7a, 7b, in order to allow bracket 8 to continue its translation toward distal wall 3. The kinetic energy of the impact thereby causes spring 13 to compress, which allows halves 8a, 8b to translate toward each other along the longitudinal axis of reduced-impact-and-recoil headrest 1, as ratcheting surfaces 9 travel down ratchet walls 7. In this orientation, the housing is stationary via the attachment of stalks 5a, 5b to a vehicle's seat, and bracket 8 translates with respect to the housing.

Referring again to FIG. 2, the housing includes interior proximal wall 11 disposed within interior compartment 6 and adjacent to proximal wall 2. Interior proximal wall 11 includes two halves 11a, 11b, which are hingedly coupled via hinge 12. As shown in FIG. 2, interior proximal wall 11 is sized to span from ratchet wall 7a to ratchet wall 7b, but is not long enough to allow halves 11a, 11b to rest on the tapered cutouts of ratchet wall 7a, 7b. As such, halves 11a, 11b will not catch on ratchet walls 7a, 7b, allowing internal proximal wall 11 to smoothly and continuously translate toward distal wall 3 without prematurely stopping due to frictional forces, which could cause whiplash or other similar injuries to an occupant.

Because interior proximal wall 11 includes hinge 12, interior proximal wall 11 is configured to deform about hinge 12 during an impact. When proximal wall 2 deforms as a result of the force exerted by the occupant's head, proximal wall 2 contacts interior proximal wall 11. Proximal wall 2 then transfers kinetic energy to interior proximal wall 11, thereby forcing interior proximal wall 11 toward distal wall 3. Because interior proximal wall 11 includes halves 11a, 11b, which are adapted to rest on ratchet walls 7a, 7h in a pre-impact configuration, interior proximal wall deforms about hinge 12 during the impact. The deformation occurs because halves 11a, 11b are initially retained by ratchet walls 7a, 7b, and the force of the occupant's head causes hinge 12 to translate along the lateral axis of reduced-impact-and-recoil headrest 1 toward distal wall 3. A result of the translation of hinge 12 is that half 11a radially translates in a counterclockwise direction about hinge 12, since half 11a remains connected to ratchet wall 7a. Similarly, half 11b radially translates in a clockwise direction about hinge 12, since half 11b remains connected to ratchet wall 7b. As hinge 12 continues to translate toward distal wall 3, the angle defined by hinge 12 with respect to the longitudinal axis of reduced-impact-and-recoil headrest becomes greater than the angle of ratchet walls 7. As a result, halves 11a, 11b travel down ratchet walls 7, similar to the translation of ratcheting surfaces 9a, 9b, above, allowing halves 11a, 11b to incrementally translate toward distal wall 3.

Interior proximal wall 11 is in mechanical communication with bracket 8 via extensions 16. Extensions 16 function similar to spring door stops by being rigid enough to remain stationary during non-impact situations, yet flexible enough to allow bracket halves 8a, 8b to translate toward and away from each other during an impact. After the impact is over, and after proximal wall 2 reaches a terminal point, extensions 16 return to the initial rigid state. The flexibility of extensions 16 allows ratcheting surfaces 9a, 9b to travel down respective ratchet walls 7a, 7b, thereby allowing proximal wall 2, interior proximal wall 11, and bracket 8 to translate toward distal wall 2. In addition, the rigidity of extensions 16 prevent bracket halves 8a, 8b from translating toward distal wall 3 without a sufficient force on proximal wall 2.

As shown in FIG. 2, dampening members are disposed within interior compartment 6 to further cushion the occupant's head during an impact. The dampening members are adapted to slow the incremental translation of bracket 8 from proximal wall 2 toward distal wall 3. For example, foam cushion 10 is disposed adjacent to proximal wall 2, between proximal wall 2 and bracket 8. Foam cushion 10 is adapted to absorb part of the impact by slowing the translation of proximal wall 2 and/or interior proximal wall 11 toward distal wall 3. Foam cushion 10 is made of a deformable material, allowing foam cushion 10 to absorb impact, compress, and decompress after the force of the impact has dissipated.

In addition, interior compartment 6 includes receiving platform 14, which is disposed adjacent to distal wall 3. Receiving platform 14 is secured against distal wall 3 via one or more springs 15, which apply a biasing force on receiving platform 14 in a direction toward proximal wall 2. During an impact, when bracket 8 translates toward distal wall 3, receiving platform 14 is adapted to receive bracket 8, preventing bracket 8 from directly contacting distal wall 3. Springs 15 are configured to compress when bracket 8 couples with receiving platform 14, thereby dampening the translation of bracket 8 toward distal wall 3. When the biasing force of springs 15 is of greater magnitude than the force of the impact, springs 15 are adapted to decompress, thereby translating receiving platform 14 in a direction toward proximal wall 2. Receiving platform 14 can thereby translate bracket 8 in a direction toward proximal wall 2 to a final, resting, post-impact position. Receiving platform 14 can also return bracket 8 to its initial, pre-impact position, depending on the length of springs 15.

Turning now to FIG. 3A, an embodiment of reduced-impact-and-recoil headrest 1 includes a stationary bracket 8 and a translatable housing. Bracket 8 is installed in a vehicle seat via stalks 5a, 5b, anchoring bracket 8 within a pair of complementary apertures disposed in an upper surface of the vehicle seat. In this configuration, the housing is adapted to translate with respect to bracket 8. For example, during an impact, proximal wall 2 is adapted to incrementally translate along a lateral axis of reduced-impact-and-recoil headrest 1 toward distal wall 2, via a ratchet mechanism similar to the mechanism described in detail above.

As shown in FIG. 3A, proximal wall 2 is discontinuous and includes first member 20a and second member 20b. First and second members 20a and 20b are adapted to pivot about hinges 21a, 21b, respectively. Hinges 21a, 21b allow first and second members 20a, 20b to radially translate toward interior compartment 6 during an impact, when an occupant's head transfers kinetic energy to reduced-impact-and-recoil headrest 1. Specifically, first member 20a is adapted to radially translate in a counterclockwise direction, and second member 20b is adapted to radially translate in a clockwise direction, both translating toward interior compartment 6.

Interior proximal wall 11 is disposed within interior compartment 6, and is sized to span from ratchet wall 7a to ratchet wall 7b, with halves 11a, 11b resting on respective ratchet walls 7a, 7b. Because the housing translates in this embodiment, halves 11a, 11b are adapted to mechanically connect with ratchet walls 7a, 7b, with the frictional forces between the components aiding in translating the housing with respect to bracket 8. In addition, halves 11a, 11b are hingedly coupled to each other via hinge 12. As discussed above, interior proximal wall 11 is thereby configured to translate along the lateral axis of reduced-impact-and-recoil headrest 1 toward distal wall 3 during an impact, with the translation occurring incrementally via the interaction between interior proximal wall 11 and ratchet walls 7a, 7b.

In this embodiment, each half 11a, 11 b of interior proximal wall 11 is translated upon receiving respective members 20a, 20b of proximal wall 2. In particular, when first and second members 20a, 20b of proximal wall 2 radially translate toward interior compartment 6, interior proximal wall halves 11a, 11b are adapted to receive respective first and second members 20a, 20b. After receiving members 20a, 20b, interior proximal wall 11 is adapted to deform about hinge 12 and translate along the lateral axis of reduced-impact-and-recoil headrest 1 via the ratchet mechanism discussed above. Since halves 11a, 11b rest on the tapered cutouts of respective ratchet walls 7a, 7b, interior proximal wall 11 is thereby adapted to pull the housing toward bracket 8 upon an impact as a result of the mechanical connection. Accordingly, during an impact, both exterior proximal wall 2 and interior proximal wall 11 are configured to deform and translate in a direction toward distal wall 3.

First and second ratchet walls 7a, 7b are mechanically coupled to side walls 4a, 4b, respectively. Specifically, first ratchet wall 7a is coupled to side wall 4a via springs 17a, and second ratchet wall 7b is coupled to side wall 4b via springs 17b. Each of springs 17a, 17b are biasing members that apply a biasing force toward the opposite spring (i.e., spring 17a applies a biasing force toward spring 17b, and vice versa). As biasing members, springs 17a, 17b force at least one of the ratchet walls 7a, 7b into contact with at least one of the ratcheting surfaces 9a, 9b. Springs 17a, 17b are also adapted to compress toward respective side walls 4a, 4b if ratchet walls 7a, 7b experience a force of a greater magnitude than that of the biasing forces, such as the force of an impact caused by a collision.

As noted above, bracket 8 is stationary in the embodiment of FIG. 3A. Accordingly, the housing translates about bracket 8 in this embodiment. As such, during an impact, proximal wall 2 and distal wall 3 remain oriented substantially parallel to each other and to the longitudinal axis of reduced-impact-and-recoil headrest 1, while members 20a, 20b mechanically coupled to proximal wall 2 translate toward interior compartment 6. Moreover, because bracket 8 includes ratcheting surfaces 9a, 9b, which are defined by a plurality of tapered extensions, the housing incrementally translates along ratcheting surfaces 9a, 9b via first and second ratchet walls 7a, 7b according to the ratchet mechanism described above.

During the translation, the kinetic energy of the impact is transferred to the housing, which then translates with respect to stationary bracket 8. The impact force is greater than the lateral component of the forces of springs 17a, 17b, which allows housing to laterally translate. However, since ratchet walls 7a, 7b are mechanically coupled to ratcheting surfaces 9a, 9b, springs 17a, 17b must be partially compressed in a longitudinal direction to allow the housing to laterally translate. Springs 17a, 17b are longitudinally compressed as a result of the mass of bracket 8 that is mechanically coupled to a vehicle seat. Because bracket 8 is stationary, a portion of the kinetic energy from the impact is transferred to ratchet walls 7a, 7b, which thereby partially compresses springs 17a, 17b. When springs 17a, 17b compress, and ratchet walls 7a, 7b longitudinally translate toward respective side walls 4a, 4b, the housing can incrementally translate toward bracket 8. The interaction between ratchet walls 7a. 7b and ratcheting surfaces 9a, 9b results in friction that slows the lateral translation of the housing.

The housing includes reset tabs 22a, 22b disposed on opposite side walls 4a, 4b of the housing. Reset tabs 22a, 22b act as a placement mechanism for the housing, allowing a user to position the housing at desired locations. Reset tabs 22a, 22b are adapted to be pulled away from side walls 4a, 4b of the housing along the lateral axis of the vehicle, which allows the housing to be positioned. Reset tabs 22a, 22b allow such positioning by being mechanically coupled to springs 17a, 17b, respectively. An example of a mechanical coupling is a hook coupled to both reset tab 22a and one of the springs 17a, such that when reset tab 22a is longitudinally pulled away from side wall 4a, one of springs 17a is partially compressed. As a result of the compression, ratchet wall 7a is longitudinally translated away from bracket 8, thereby partially detaching the housing from bracket 8. The detachment allows the housing to be translated to a different position with respect to bracket 8. When a user discontinues applying a pulling force on reset tab 22a, the partially compressed spring 17a decompresses, allowing ratchet wall 7a to mechanically couple with bracket 8. Accordingly, a user could use reset tabs 22a, 22b to select a comfortable position for the housing, such that the user's head is received by proximal wall 2. In addition, reset tabs 22a, 22.b can be used to reposition the housing after an impact causes the housing to translate toward bracket 8.

Turning now to FIG. 3B, the housing is shown in a post-impact configuration. In the post-impact configuration, members 20a, 20b of proximal wall 2 radially translate about hinges 21a, 21b toward bracket 8. As such, proximal wall 2 is adapted to provide a comfortable resting place for a vehicle occupant's head by deforming and separating members 20a, 20b from one another. Proximal wall 2 thereby reduces the impact felt by the occupant, in part by providing a space for the occupant's head to be received during a collision. Similarly, interior proximal wall halves 11a, 11b deform about hinge 12, such that hinge 12 translates toward bracket 8.

The components within internal compartment 6 function to slow the translation of the occupant's head toward distal wall 3, and to prevent the occupant's head from quickly translating toward a front end of a vehicle after a collision, thereby reducing the risk of whiplash. For example, foam cushion 10 is disposed between proximal wall 2 and bracket 8 to slow the translation of reduced-impact-and-recoil headrest 1 toward bracket 8. Foam cushion 10 reduces part of the impact force by absorbing a portion of the kinetic energy from the translation of reduced-impact-and-recoil headrest 1. As such, foam cushion 10 slows the translation of reduced-impact-and-recoil headrest 1 toward bracket 8. In addition, the complementary tapers formed by the interaction between ratchet walls 7a, 7b and ratcheting surfaces 9a, 9b convert a portion of the kinetic energy from the collision into friction energy, thereby slowing reduced-impact-and-recoil headrest 1 as ratchet walls 7a, 7b slide down ratcheting surfaces 9a, 9b. Moreover, the tapers prevent reduced-impact-and-recoil headrest 1 from automatically translating back to its pre-impact position, reducing the occupant's risk of whiplash. After the collision, reduced-impact-and-recoil headrest 1 can be repositioned via reset tabs 22a, 22b, as discussed above.

Figure 3C:
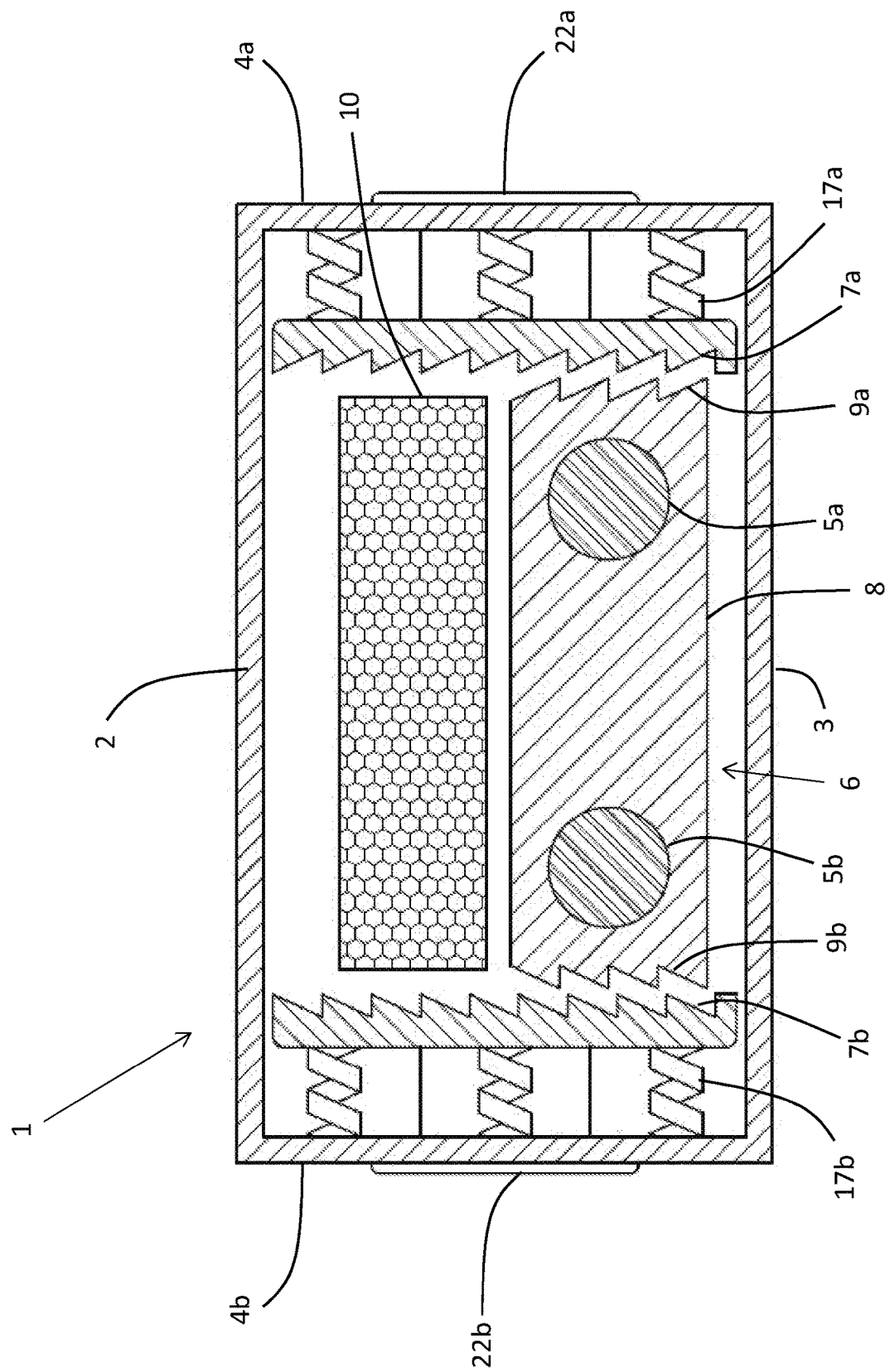
FIG. 3C is a cross-sectional view of a reduced-impact-and-recoil headrest with a nonstationary housing and a solid set of walls.

FIG. 3C shows an alternative embodiment of reduced-impact-and-recoil headrest 1 having a continuous and singular proximal wall 2, as well as the ratchet mechanism discussed in detail above. Reduced-impact-and-recoil headrest 1 may be disposed within a cushioned headrest casing, such that reduced-impact-and-recoil headrest 1 is surrounded by cushioning material adapted to provide a surface for an occupant's head. As such, reduced-impact-and-recoil headrest 1 is adapted to translate when impacted by the cushioned casing during a collision. Specifically, reduced-impact-and-recoil headrest 1 translates along the longitudinal axis of the vehicle and toward bracket 8, such that in a post-impact configuration, proximal wall 2 is disposed substantially adjacent to bracket 8. As discussed in detail above, the ratchet mechanism reduces the impact of a collision experienced by an occupant, as well as prevents the translation of reduced-impact-and-recoil headrest 1 toward the front end of the vehicle, thereby minimizing the risk of the occupant experiencing whiplash.

Example 2

Figure 4B:
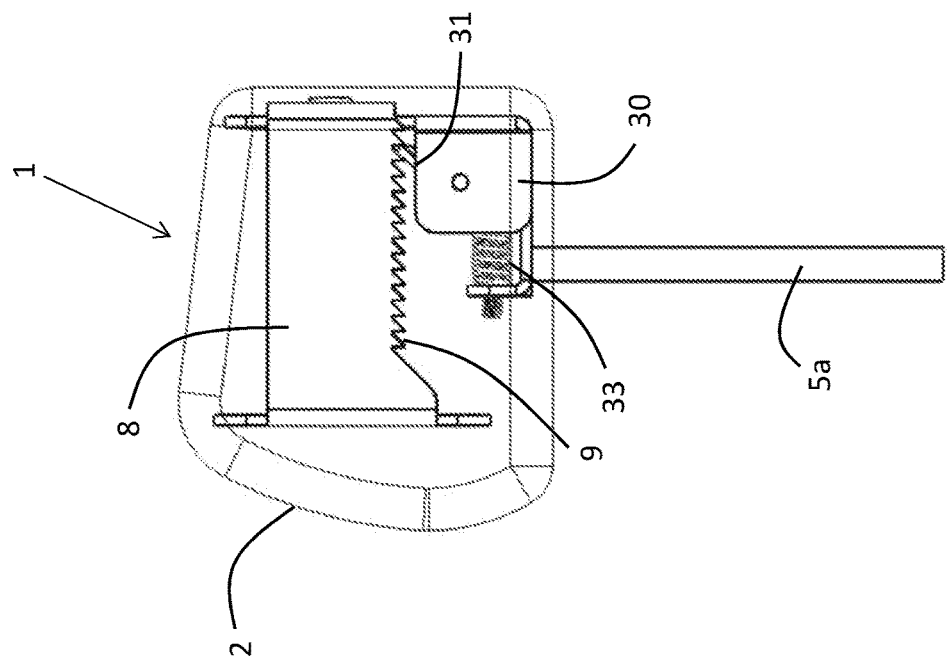
FIG. 4B is an orthogonal side view of the internal components of the headrest of FIG. 4A.
Figure 4A:
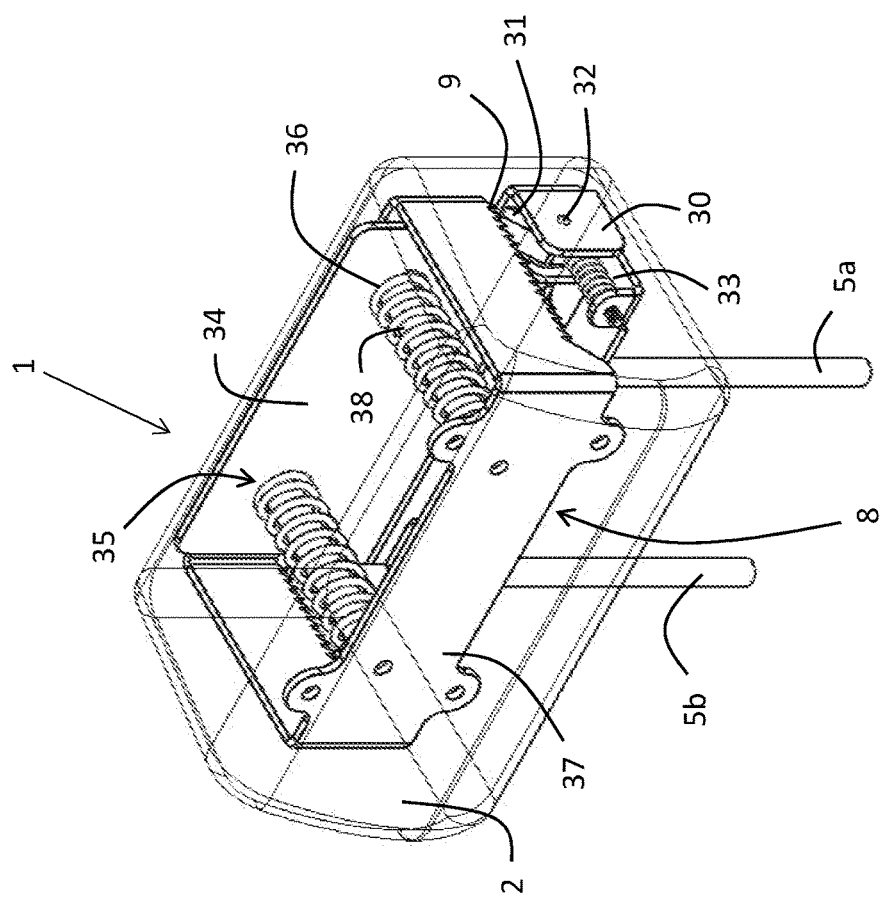
FIG. 4A is a perspective view of internal components of an embodiment of a reduced-impact-and-recoil headrest.

In an embodiment of the present invention, as shown, for example, in FIG. 4A, headrest 1 includes proximal wall 2, distal wall 3, and sidewalls 4a, 4b. The walls define interior compartment 6, within which movable bracket 8 is disposed. Also disposed within interior compartment is base 30, which is adapted to be anchored to a vehicle's seat via stalks 5a, 5b, which are coupled to base 30. As such, in use, base 30 remains substantially stationary, while headrest 1 translates with respect to base 30, particularly during an impact. However, it should be appreciated that, so long as base 30 is adapted to be secured to the vehicle's seat via, for example, stalks 5a, 5b, it is unimportant whether base 30 is disposed within interior compartment 6. So long as headrest 1 translates with respect to base 30, base 30 can be disposed within interior compartment 6, or adjacent to distal wall 3.

As shown in FIGS. 4A-4B, base 30 includes tab 31 and tab spring 33 coupled thereto, as well as pivot hinge 32 coupled to tab 31. Tab 31 is in communication with ratcheting surface 9 (alternatively may be referred to as teeth 9) on bracket 8. When headrest 1 translates with respect to base 30, ratcheting surfaces 9 incrementally translate along the longitudinal axis of a vehicle due to the interaction between ratcheting surfaces 9 and tab 31. Similarly, tab 31 provides for the incremental translation because tab spring 33 is biased such that tab 31 creates an obtuse angle with respect to tab spring 33, and because pivot hinge 32 provides for the rotation of tab 31 about hinge 32. As such, when bracket 8 translates toward distal wall 3 of headrest 1, tab 31 rotationally translates toward a bottom surface of headrest 1 (i.e., the surface through which talks 5a, 5b enter interior compartment 6), thereby partially compressing tab spring 33. However, when tab spring 33 no longer receives a compression force, tab spring 33 decompresses, resetting tab 31 to its original position on another tooth of ratcheting surface 9. FIGS. 4A-4B only show one side of headrest 1; however, it is appreciated that the opposing side of headrest 1 includes the same components, as will be shown in FIGS. 4C-4D, discussed in greater detail below. Base 30 also includes stopper wall 34 extending perpendicularly therefrom, with stopper wall 34 including a plurality of apertures 35 disposed therein. The function of the stopper wall 34 and apertures 35 will be discussed below.

FIGS. 4A-4B also show bracket 8 in detail. Bracket 8 is disposed within interior compartment 6 and is secured to headrest 1, such that when headrest 1 translates, bracket 8 also translates. Bracket 8 includes one or more ratcheting surfaces 9, discussed above, which are in communication with tab 31 of base 30. Bracket 8 also includes rods 36 extending perpendicularly from proximal bracket wall 37 and through apertures 35 defined by stopper wall 34 of base 30. Rods 36 are surrounded by bracket springs 38, which are disposed between proximal bracket wall 37 and stopper wall 34. Importantly, a diameter of bracket springs 38 is greater than a diameter of apertures 35, while a diameter of rods 36 is smaller than the diameter of apertures 35. As such, rods 36 are insertable through apertures 35, while bracket springs 38 remain disposed between proximal bracket wall 37 and stopper wall 34 in both a pre-impact configuration and a post-impact configuration.

Figure 4D:
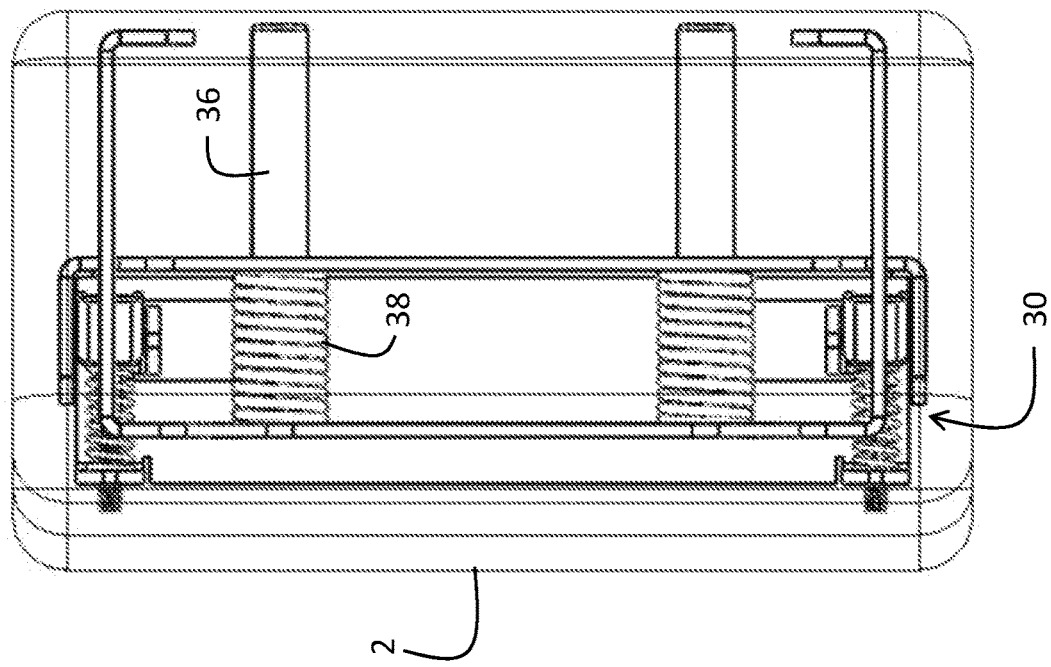
FIG. 4D is an orthogonal top-down view of the internal components of the headrest of FIG. 4A in a post-impact configuration.
Figure 4C:
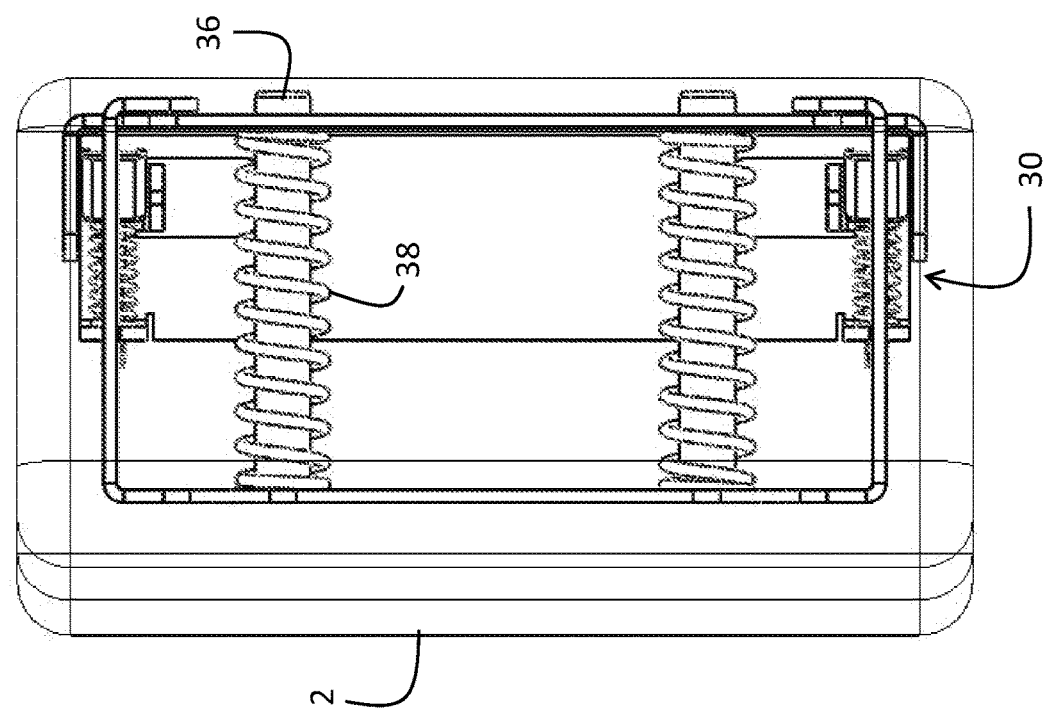
FIG. 4C is an orthogonal top-down view of the internal components of the headrest of FIG. 4A in a pre-impact configuration.
Figure 4E:
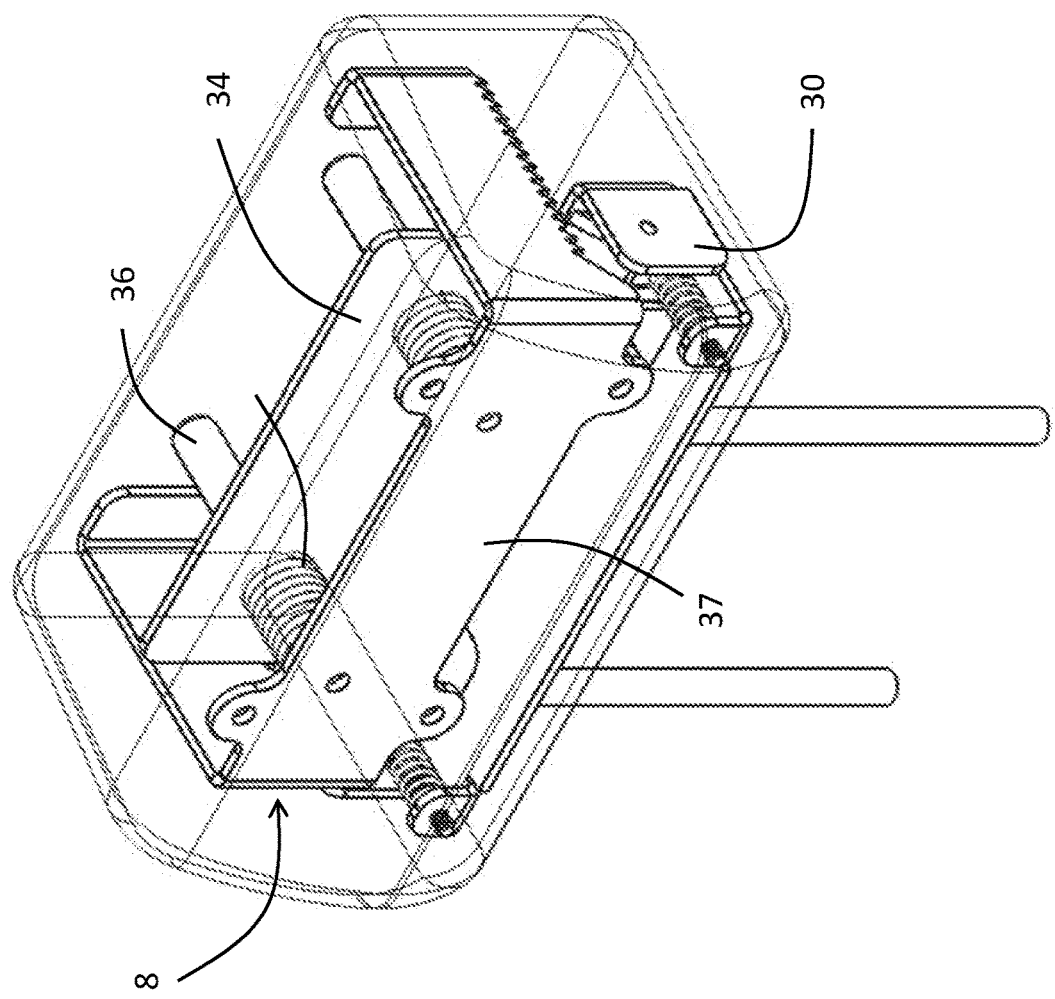
FIG. 4E is a perspective view of the internal components of the headrest of FIG. 4A in a post-impact configuration.

FIGS. 4C-4E show the pre-impact configuration (FIG. 4C) and the post-impact configuration (FIGS. 4D-4E) of the assembly of FIGS. 4A-4B. As shown in FIG. 4C, in the pre-impact configuration, bracket springs 38 are decompressed and act as spacers between proximal bracket wall 37 and stopper wall 34. Also shown in FIG. 4C, rods 36 are partially inserted through apertures 35. When experiencing an impact, headrest 1 translates with respect to base 30 along one or more ratchet surfaces 9 of bracket 8; as such, bracket 8 also translates with respect to the stationary base 30. As shown in FIGS. 4D-4E, in the post-impact configuration, rods 36 translate with respect to apertures 35 as proximal bracket wall 37 translates toward stationary stopper wall 34, and bracket springs 38 compress between proximal bracket wall 37 and stopper wall 34 as a result. Tab 31 prevents the automatic resetting of bracket 8 with respect to base 30, such that base 30 prevents headrest 1 from recoiling to the pre-impact configuration. As such, a vehicle passenger's head resting on headrest 1 similarly does not suddenly recoil to a pre-impact position, such that headrest 1 deters a potential traumatic brain injury for the passenger.

Figure 5A:
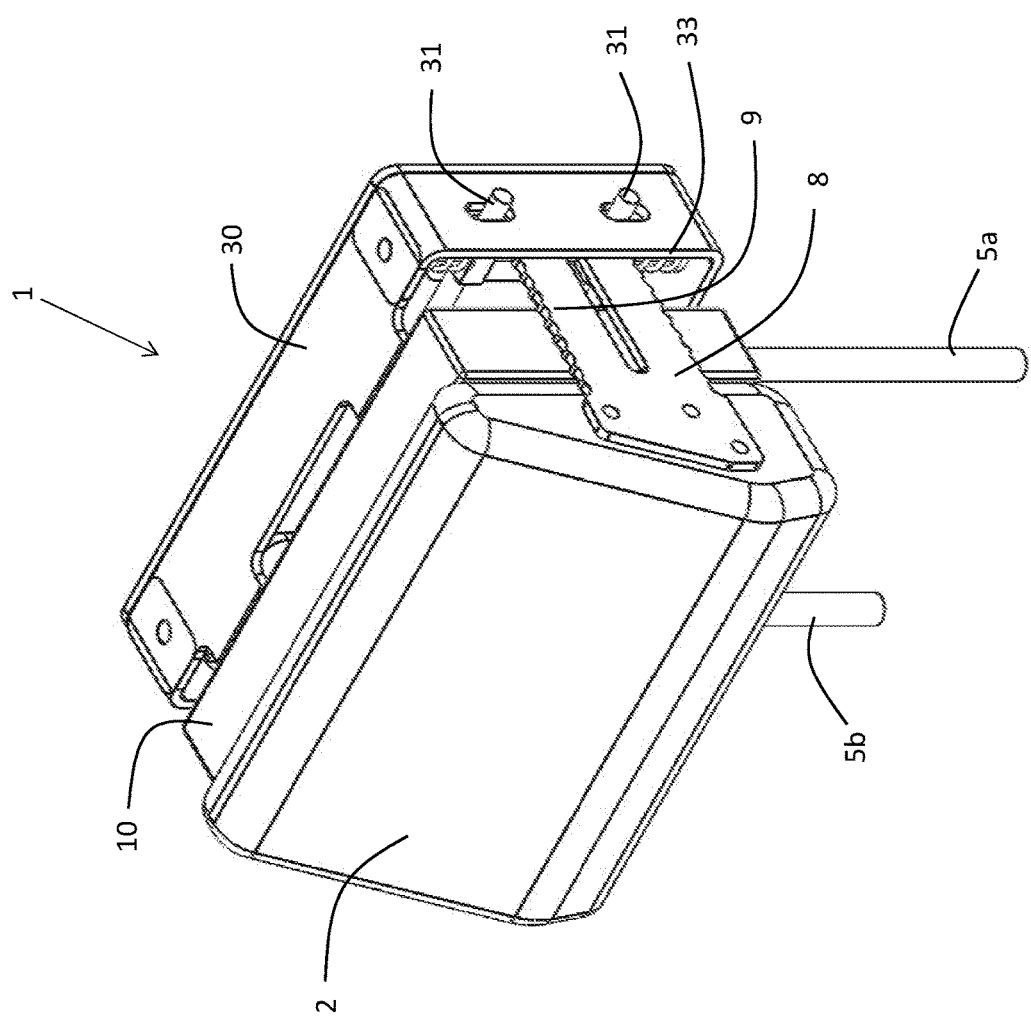
FIG. 5A is a perspective view of an embodiment of a reduced-impact-and-recoil headrest.
Figure 5B:
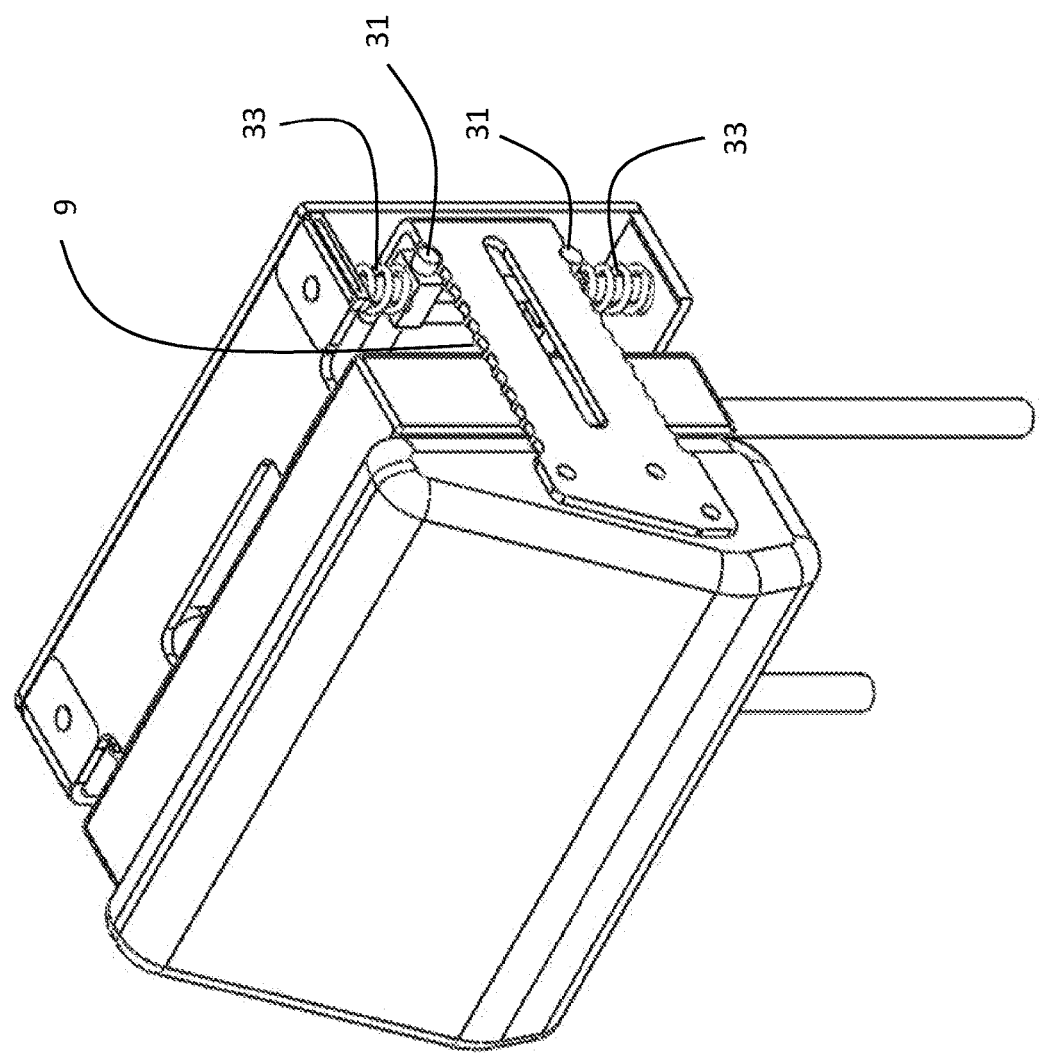
FIG. 5B is a perspective view of the headrest of FIG. 5A with an outer wall removed to show the internal components of the headrest.
Figure 5C:
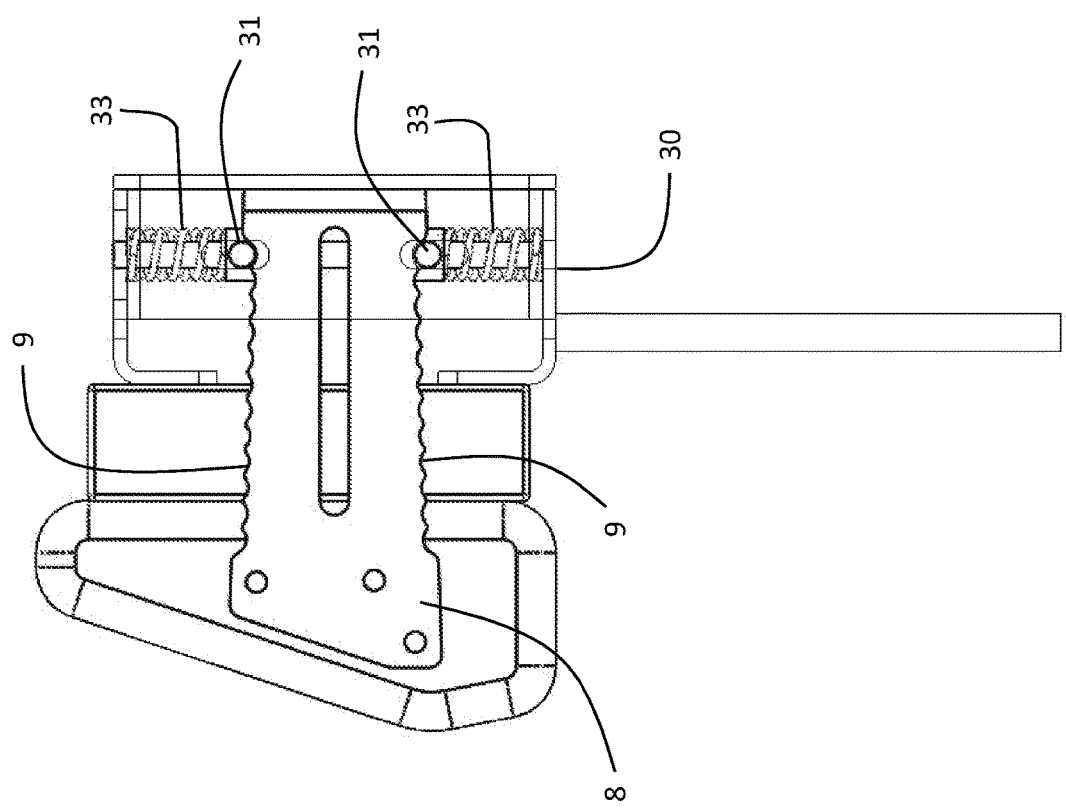
FIG. 5C is an orthogonal side view the headrest of FIG. 5A, showing the internal components of the headrest.

FIGS. 5A-5C depict an embodiment of headrest 1 in which base 30 is disposed adjacent to headrest 1. Base 30 is adapted to be anchored to a vehicle seat via stalks 5a, 5b. In this embodiment, headrest 1 includes opposing brackets 8 attached thereto (only one bracket 8 is depicted in FIGS. 5A-5C; however, it is appreciated that the opposing side of headrest 1 also includes bracket 8, so that headrest 1 can equally translate on both sides thereof). Each bracket 8 includes one or more ratcheting surfaces 9 which are in communication with one or more tabs 31 of base 30, with the one or more tabs 31 being coupled to tab springs 33. Foam cushion 10 may be disposed between headrest 1 and base 30 to slow the longitudinal translation of headrest 1 toward base 30. During an impact, headrest 1 translates toward base 30 via the interaction between ratcheting surfaces 9 and tabs 31, wherein tab springs 33 are partially compressed during incremental translations of individual teeth of ratcheting surfaces 9. Similar to the mechanism discussed in relation to FIGS. 4A-4D above, tabs 31 prevent the automatic resetting of bracket 8 with respect to base 30.

Figure 6C:
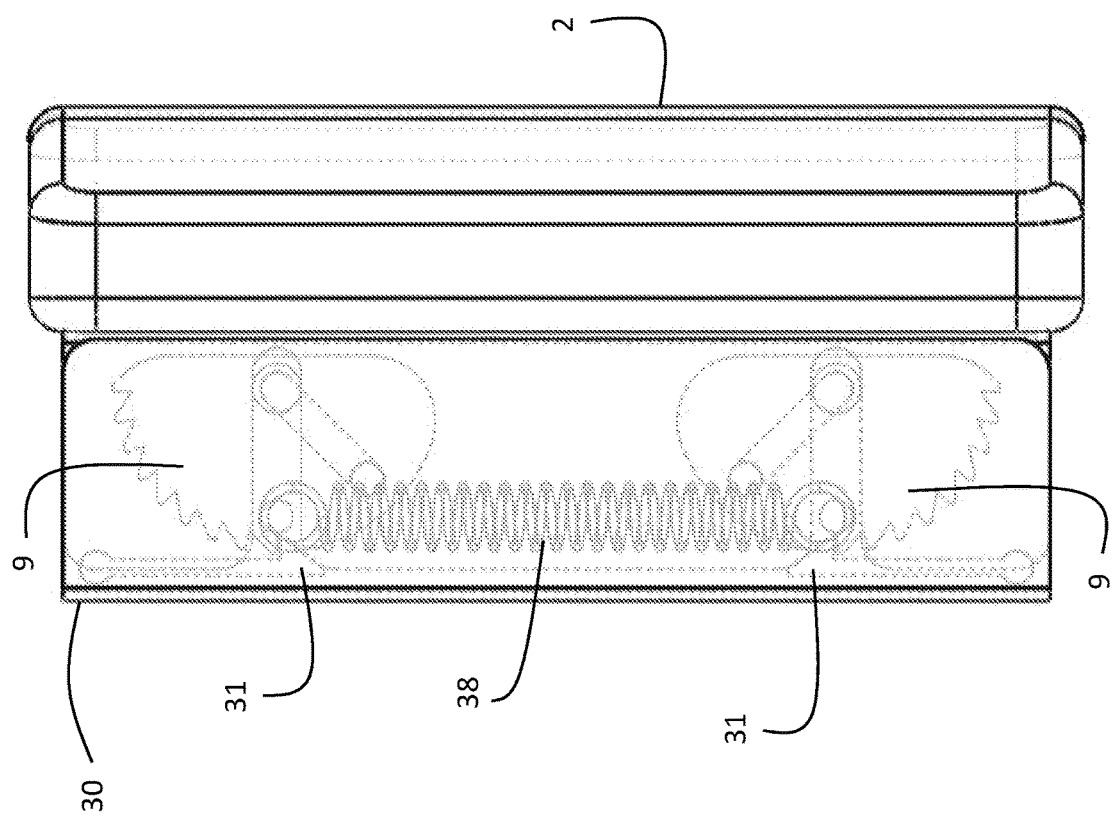
FIG. 6C is an orthogonal top-down view of the internal components of the headrest of FIG. 6A is a post-impact configuration.
Figure 6E:
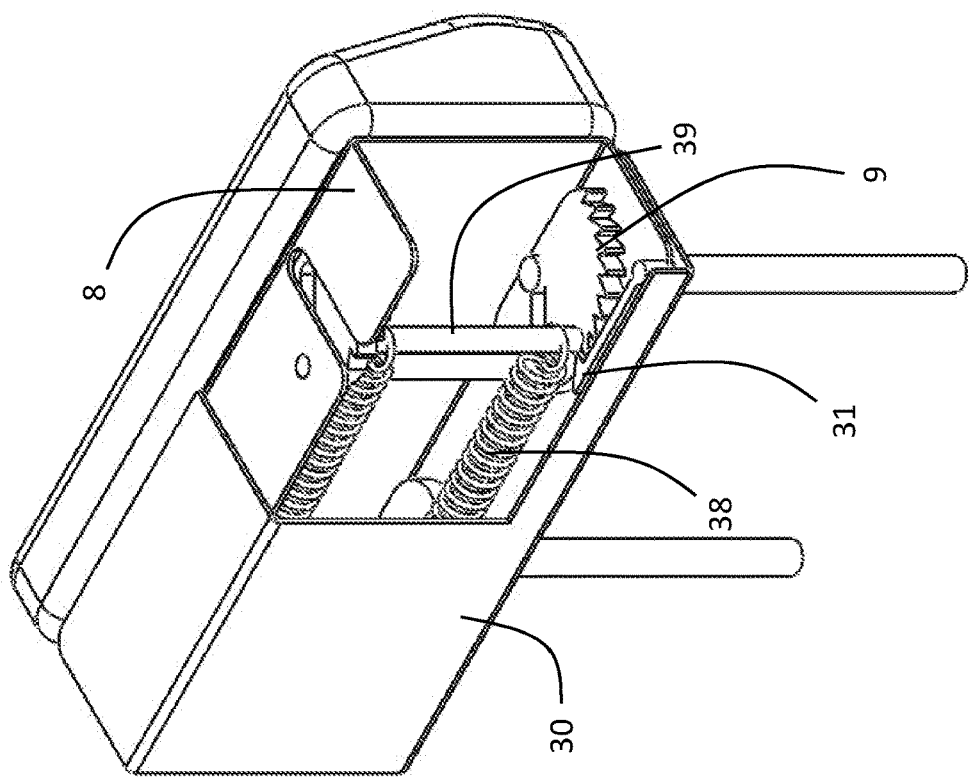
FIG. 6E is a perspective view of the headrest of FIG. 6A with an outer wall removed to show the internal components of the headrest in a post-impact configuration.
Figure 6D:
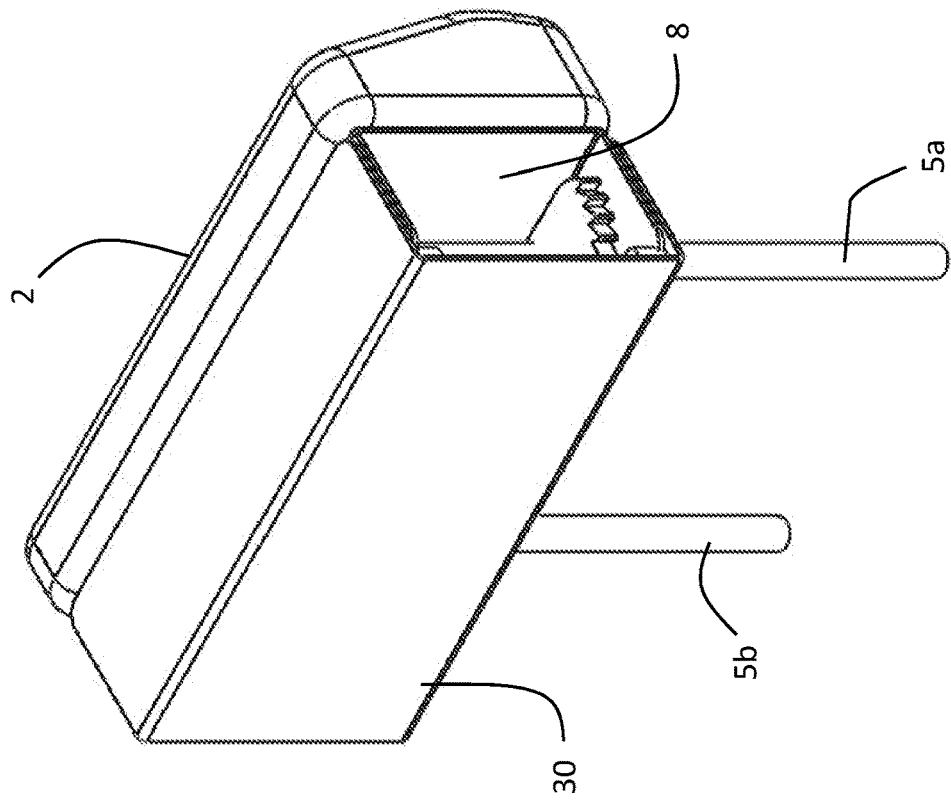
FIG. 6D is a perspective view of the headrest of FIG. 6A in a post-impact configuration.

FIGS. 6A-6E depict an embodiment of headrest 1 in which base 30 is disposed adjacent to headrest 1, and in which bracket 8 is secured to distal wall 3 of headrest 1 between headrest 1 and base 30. Similar to the embodiments above, base 30 is adapted to be anchored to a vehicle seat via stalks 5a, 5b. Bracket 8 includes ratcheting surfaces 9 coupled thereto, with ratcheting surfaces 9 being in communication with tabs 31 disposed on base 30. As shown in particular in FIG. 6B, in an embodiment, bracket 8 includes two pairs of semicircular ratcheting surfaces 9, with each ratcheting surface 9 of each pair being coupled via one or more coupling rods 39. In addition, the pairs of ratcheting surfaces 9 are coupled to one another via one or more bracket springs 38 disposed therebetween, with bracket springs 38 being in a resting state in a pre-impact configuration, as shown in FIG. 6B. FIGS. 6C-6E depict headrest 1 in a post-impact configuration, in which each pair of ratcheting surfaces 9 incrementally pivots on tabs 31 and decompresses each of bracket springs 38 as at least two connected coupling rods 39 translate radially away from each other; thereby pulling bracket springs 38 apart. In this post-impact configuration, bracket 8 and headrest 1 translate toward base 30; similar to the mechanisms discussed above, tabs 31 prevent the automatic resetting of bracket 8 with respect to base 30.

Figure 7A:
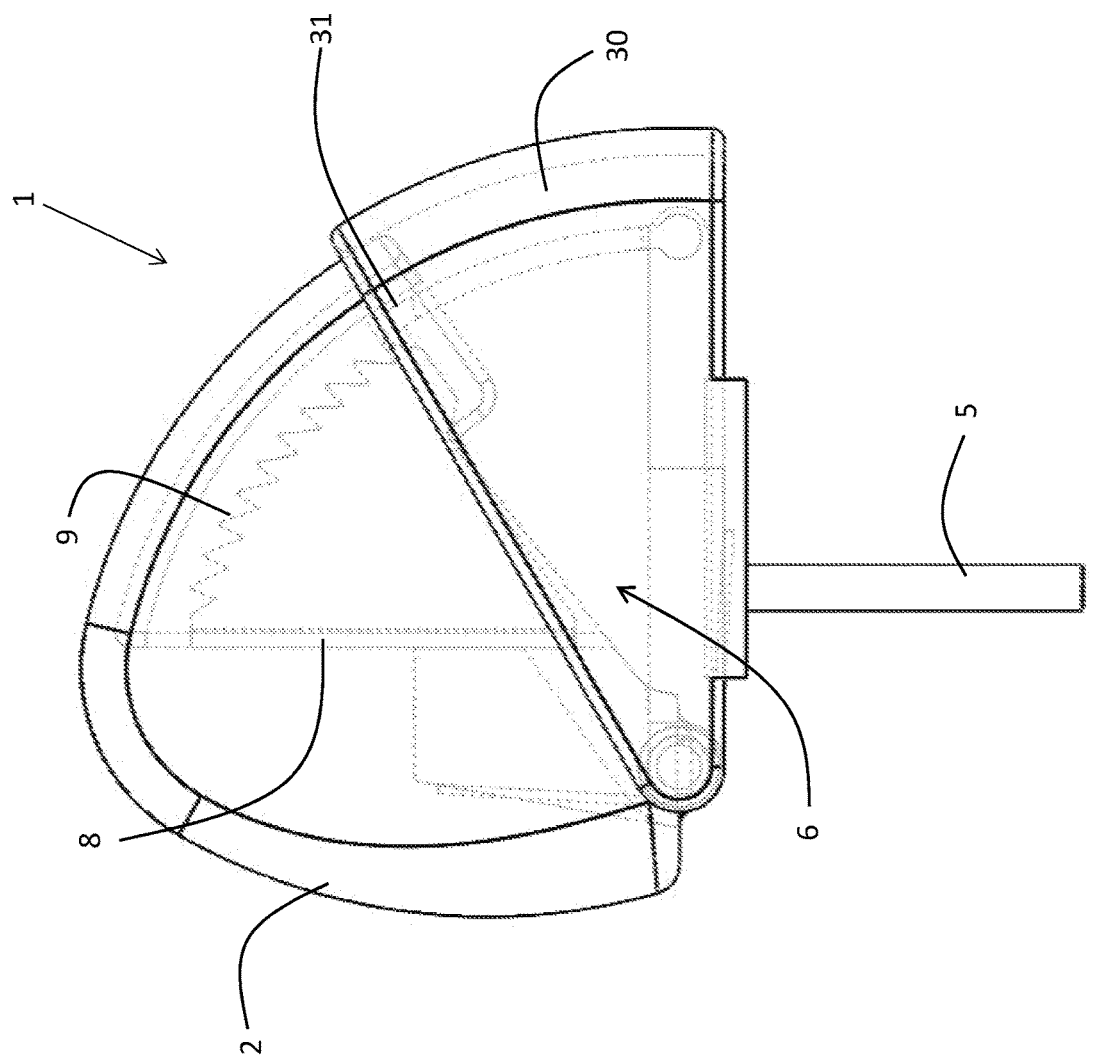
FIG. 7A is an orthogonal view of internal components of an embodiment of a reduced-impact-and-recoil headrest in a pre-impact configuration.
Figure 7B:
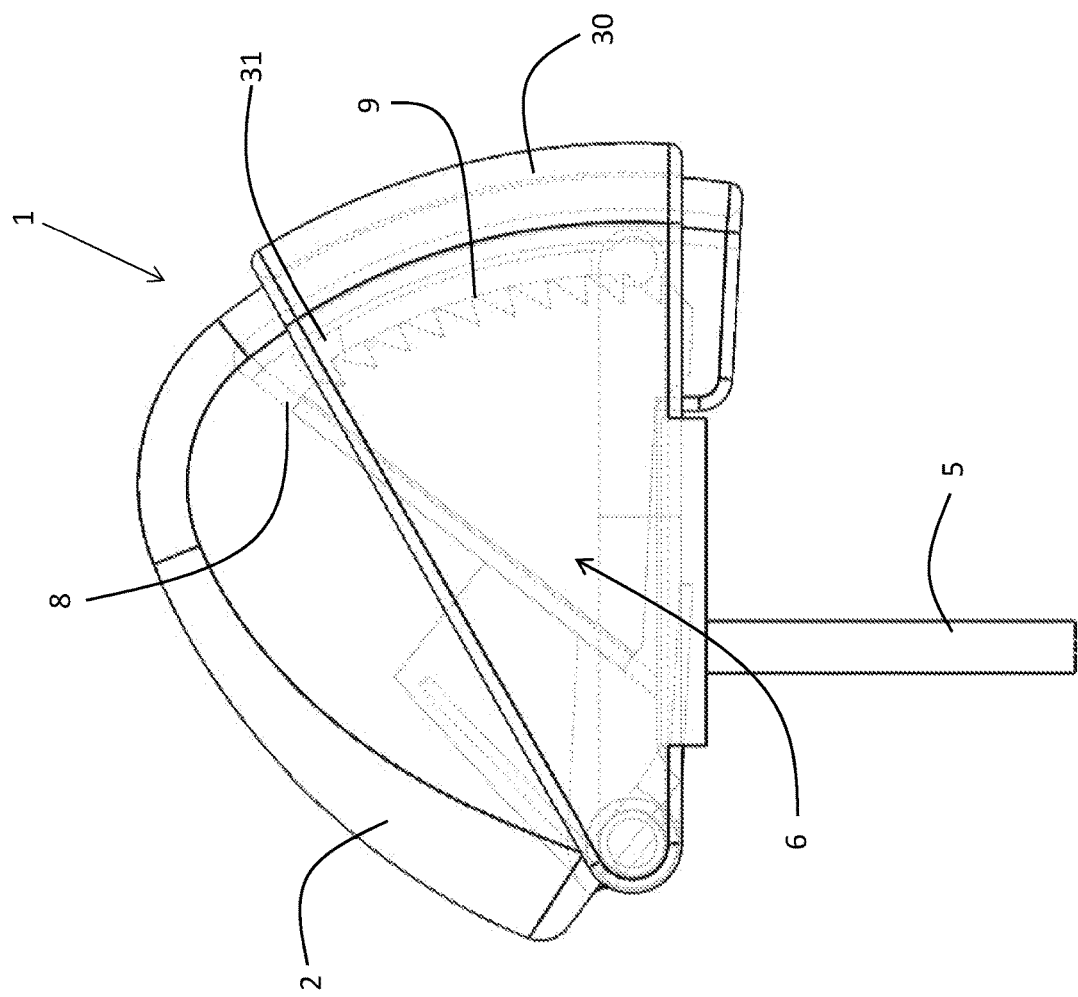
FIG. 7B is an orthogonal side view of internal components of the headrest of FIG. 7A in a post-impact configuration.

FIGS. 7A-7B depict an embodiment of headrest 1 comprising base 30 and bracket 8, in which base 30 and bracket 8 are together form interior compartment 6 of headrest 1. As shown in FIGS. 7A-7B, base 30 is adapted to be secured to a vehicle seat via stalks 5a, 5b. In addition, base 30 is disposed to receive the portion of headrest 1 including bracket 8 therein. Base 30 includes at least one tab 31 secured thereto, and bracket 8 includes one or more ratcheting surfaces 9 each including a plurality of teeth, with the one or more ratcheting surfaces 9 in mechanical communication with the at least one tab 31. During an impact, as shown in FIG. 7B in particular, bracket 8 incrementally translates toward base 30 via the mechanical interaction between tab 31 and ratcheting surface 9, with tab 31 preventing the automatic resetting of bracket 8 with respect to base.

Glossary of Claim Terms

Biasing Member: is a device adapted to rebound back to a position of repose when it is no longer subject to an external force.

Deformable: flexible material that is capable of being altered in shape due to a received force.

Housing: is a casing defining an interior compartment and including a bracket and ratchet mechanism.

Lateral Axis: extending from a driver side of a vehicle to a passenger side of the vehicle.

Lateral Contacting Surface: is a first component of a ratchet mechanism, in mechanical communication with a bracket and adapted to interact with a lateral interior surface. An example of a lateral contacting surface is a ratcheting surface disposed on the bracket.

Lateral Interior Surface: is a second component of a ratchet mechanism, in mechanical communication with a bracket and adapted to interact with a lateral contacting surface. An example of a lateral interior surface is a ratchet wall within the housing.

Longitudinal Axis: extending from a front bumper of a vehicle to a rear bumper of the vehicle.

Post-Impact Configuration: is a configuration of a reduced-impact-and-recoil headrest, particularly referring to the spatial relationship between a bracket and a housing, prior to a collision.

Pre-Impact Configuration: is a configuration of a reduced-impact-and-recoil headrest, particularly referring to the spatial relationship between a bracket and a housing, after a collision.

Ratchet Mechanism: is a system including a first and a second component, wherein one of the two components can incrementally translate with respect to the other component.

Stalk: is a member that extends in a direction away from a housing that is designed to be received by an aperture to anchor the housing within a vehicle seat.

REFERENCES

[1] National Safety Council. *Everyone Has a Role in Making Our Roads Safer*. Dec. 14, 2017.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A headrest comprising:
    a housing adapted to be installed within a vehicle having a longitudinal axis from a front bumper to a rear bumper, the housing having a front-bumper facing wall opposite a rear-bumper facing wall;
    a bracket coupled to the housing, the bracket including at least one ratcheting surface;
    a base in mechanical communication with the bracket, the base secured to one or more stalks extending perpendicularly from the base and adapted to be secured to a seat of the vehicle, the base including at least one tab coupled to the at least one ratcheting surface; and
    a biasing member coupled to the at least one tab and forcing the at least one tab into contact with the at least one ratcheting surface,
    wherein the bracket is adapted to incrementally and linearly translate along the longitudinal axis with respect to the base via an incremental mechanical interaction between the at least one tab and the at least one ratcheting surface and via a compression and rebound to a position of repose of the biasing member.

2. The headrest of claim 1, further comprising:
    an interior compartment of the housing between the front-bumper facing wall and the rear-bumper facing wall,
    wherein the bracket and the base are disposed within the interior compartment.

3. The headrest of claim 2, further comprising:
    a stopper wall perpendicularly extending from the base such that the stopper wall is substantially parallel to the rear-bumper facing wall, the stopper wall defining at least one aperture;
    a proximal bracket wall disposed on the bracket adjacent to the front-bumper facing wall, the proximal bracket wall parallel to the stopper wall; and
    at least one rod coupled to the proximal bracket wall and extending toward the stopper wall, the at least one rod insertable through the at least one aperture.

4. The headrest of claim 3, further comprising:
a spring surrounding the at least one rod, the spring having a diameter greater than a diameter of the at least one aperture defined by the stopper wall,
wherein the spring is adapted to compress between the proximal bracket wall and the stopper wall as the proximal bracket wall translates toward the stopper wall.

5. The headrest of claim 1, further comprising a foam cushion disposed between the bracket and the base, wherein the foam cushion slows the incremental translation of the bracket with respect to the base.

6. The headrest of claim 1, wherein the at least one ratcheting surface is a first ratcheting surface, further comprising a second ratcheting surface indirectly coupled to the first ratcheting surface via a first coupling rod, wherein an incremental translation of the first ratcheting surface also incrementally translates the second ratcheting surface.

7. The headrest of claim 6, wherein the first and second ratcheting surfaces form a first pair of ratcheting surfaces, further comprising a second pair of ratcheting surfaces including a third ratcheting surface and fourth ratcheting surface, the third and fourth ratcheting surfaces coupled via a second coupling rod.

8. The headrest of claim 7, wherein the first and second pairs of ratcheting surfaces are coupled to each other via a spring coupled to the first coupling rod and the second coupling rod, wherein the spring receives a decompression force when the first and second coupling rods translate away from each other in a post-impact configuration.

9. The headrest of claim 1, wherein the bracket is slidably coupled to the base, with an outer surface of the bracket is in mechanical communication with an inner surface of the base, such that the bracket is slidably translatable toward and is receivable by the base.

10. A headrest comprising:
a housing adapted to be installed within a vehicle having a longitudinal axis from a front bumper to a rear bumper, the housing having a front-bumper facing wall opposite a rear-bumper facing wall, the front-bumper facing wall and the rear-bumper facing wall defining an interior compartment;
a bracket coupled to the housing and disposed within the interior compartment, the bracket including a first ratcheting surface and a second ratcheting surface;
a base disposed within the interior compartment and in mechanical communication with the bracket, the base secured to one or more stalks extending perpendicularly from the housing and adapted to be secured to a seat of the vehicle, the base including a first tab in mechanical communication with the first ratcheting surface and a second tab in mechanical communication with the second ratcheting surface, and
a pair of biasing members, each biasing member coupled to one of the first and second tabs and forcing the first and second tabs into contact with the respective first and second ratcheting surfaces,
wherein the bracket is adapted to incrementally and linearly translate along the longitudinal axis with respect to the base via an incremental mechanical interaction between the first and second tabs and the first and second ratcheting surfaces, and via a compression and rebound to a position of repose of each biasing member.

11. The headrest of claim 10, further comprising a stopper wall perpendicularly extending from the base such that the stopper wall is substantially parallel to the rear-bumper facing wall, the stopper wall defining at least one aperture,
wherein the stopper wall is adapted to be disposed adjacent to the rear-bumper facing wall in a pre-impact configuration and disposed adjacent to the front-bumper facing wall in a post-impact configuration.

12. The headrest of claim 11, further comprising a proximal bracket wall disposed on the bracket adjacent to the front-bumper facing wall, the proximal bracket wall parallel to the stopper wall,
wherein the proximal bracket wall is adapted to translate toward the stopper wall in the post-impact configuration.

13. The headrest of claim 12, further comprising at least one rod coupled to the proximal bracket wall and extending toward the stopper wall, the at least one rod insertable through the at least one aperture.

14. The headrest of claim 13, further comprising a spring surrounding the at least one rod, the spring having a diameter greater than a diameter of the at least one aperture defined by the stopper wall,
wherein the spring is adapted to compress between the proximal bracket wall and the stopper wall as the proximal bracket wall translates toward the stopper wall.

* * * * *